United States Patent
Cimpu et al.

(10) Patent No.: US 10,631,303 B2
(45) Date of Patent: Apr. 21, 2020

(54) CUMULATIVE INTERFERENCE ALLOCATION

(71) Applicant: Telefonaktiebolaget LM Ericsson (publ), Stockholm (SE)

(72) Inventors: Virgil Cimpu, Ottawa (CA); Gary Boudreau, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/761,636

(22) PCT Filed: Feb. 8, 2018

(86) PCT No.: PCT/IB2018/050793
§ 371 (c)(1),
(2) Date: Mar. 20, 2018

(87) PCT Pub. No.: WO2018/150303
PCT Pub. Date: Aug. 23, 2018

(65) Prior Publication Data
US 2019/0141713 A1  May 9, 2019

Related U.S. Application Data

(63) Continuation-in-part of application No. PCT/IB2017/056966, filed on Nov. 7, 2017.
(Continued)

(51) Int. Cl.
*H04W 72/00* (2009.01)
*H04W 72/08* (2009.01)
(Continued)

(52) U.S. Cl.
CPC ......... *H04W 72/082* (2013.01); *H04W 16/02* (2013.01); *H04W 16/14* (2013.01);
(Continued)

(58) Field of Classification Search
CPC .................................................. H04W 72/082
See application file for complete search history.

(56) References Cited

U.S. PATENT DOCUMENTS

| | | | |
|---|---|---|---|
| 2017/0041801 A1 | 2/2017 | Liu et al. | |
| 2018/0132111 A1* | 5/2018 | Mueck | H04W 16/14 |
| 2018/0192295 A1* | 7/2018 | Mueck | H04W 16/14 |

FOREIGN PATENT DOCUMENTS

WO  2016/195751 A1  8/2016

OTHER PUBLICATIONS

Gomadam, Krishna, Viveck R. Cadambe, and Syed A. Jafar. "A Distributed Numerical Approach to Interference Alignment and Applications to Wireless Interference Networks." IEEE Transactions on Information Theory, vol. 57, No. 6; Jun. 2011; pp. 3309-3322, consisting of 14 pages.

(Continued)

*Primary Examiner* — John D Blanton
(74) *Attorney, Agent, or Firm* — Christopher & Weisberg, P.A.

(57) ABSTRACT

A controlling node and a method in a controlling node for distribution of an interference quota (IQ) among a plurality of network nodes are provided. The method includes identifying a number of network node clusters, a network node cluster defined as a group out of the plurality of network nodes being located within a predetermined distance of each other; dividing the IQ by the number of network node clusters to provide a cluster quota; and distributing the cluster quota among each network node within each identified network node cluster.

16 Claims, 13 Drawing Sheets

Related U.S. Application Data

(60) Provisional application No. 62/458,870, filed on Feb. 14, 2017.

(51) Int. Cl.
*H04W 16/14* (2009.01)
*H04W 16/02* (2009.01)
*H04W 72/10* (2009.01)
*H04W 72/04* (2009.01)
*H04W 28/16* (2009.01)

(52) U.S. Cl.
CPC ............ *H04W 72/10* (2013.01); *H04W 28/16* (2013.01); *H04W 72/0453* (2013.01)

(56) References Cited

OTHER PUBLICATIONS

Schmidt, David A., et al., "Comparison of Distributed Beamforming Algorithms for MIMO Interference Networks." IEEE Transactions on Signal Processing, vol. 61, No. 13; Jul. 2013; pp. 3476-3489, consisting of 14 pages.

Cadambe,Viveck et al., "Interference Alignment and Degrees of Freedom of the K-User Interference Channel." IEEE Transactions on Information Theory. vol. 54, No. 8; Aug. 2008; pp. 3425-3441, consisting of 17 pages.

Wikipedia, the free encyclopedia—https://en.wikipedia.org/wiki/Hata_Model; "Hata Model", Jul. 28, 2006, consisting of 6 pages.

Wikipedia, the free encyclopedia—https://en.wikipedia.org/wiki/Longley%E2%80%93Rice_model; "Longley-Rice Model", May 9, 2011, consisting of 1 page.

International Search Report and Written Opinion of the International Searching Authority dated Apr. 23, 2018 issued in corresponding PCT Application Serial No. PCT/IB2018/050793, consisting of 14 pages.

Kim Chang Wook et al: "Design and Implementation of an End-to-End Architecture for 3.5 GHz Shared Spectrum", 2015 IEEE International Symposium on Dynamic Spectrum Access Networks (DySPAN); Sep. 29, 2015, pp. 23-34. (12 pages).

Munawwar M. Sohul et al., "Spectrum Access System for the Citizen Broadband Radio Service", IEEE Communications Magazine; Jul. 17, 2015, pp. 18-25. (8 pages).

Written Opinion of the International Preliminary Examining Authority dated Jan. 29, 2019 issued in corresponding PCT Application No. PCT/IB218/050793, consisting of 9 pages.

Notification of Transmittal of the International Preliminary Report on Patentability dated Apr. 10, 2019 issued in corresponding PCT Application No. PCT/IB218/050793, consisting of 36 pages.

\* cited by examiner $UV(a,n) = UV(b,n) = max\{UV'(a,n), UV'(b,n)\}$ though there is sufficient capability in the rules to provision wide area macro deployments, as well.

CUMULATIVE INTERFERENCE ALLOCATION

CROSS-REFERENCE TO RELATED APPLICATIONS

This application is a Submission Under 35 U.S.C. § 371 for U.S. National Stage Patent Application of International Application Number: PCT/IB2018/050793, filed Feb. 8, 2018, entitled "CUMULATIVE INTERFERENCE ALLOCATION" and claims priority to U.S. Provisional Patent Application No. 62/458,870, filed Feb. 14, 2017, entitled "CUMULATIVE INTERFERENCE ALLOCATION." This Application also claims priority to International Application Number: PCT/IB2017/056966, filed Nov. 7, 2017. The entireties of all of which are incorporated herein by reference.

TECHNICAL FIELD

Wireless communication and in particular, methods and apparatuses for interference allocation.

BACKGROUND

The advance of mobile cellular networks and the popularity of mobile devices combined with the constant growth in user throughput have created a huge demand for at least one resource: spectrum.

There are three main approaches toward spectrum management, which are listed as follows:
  License the spectrum to operators that will pay significant fees for the privilege of using dedicated spectrum;
  Use unlicensed spectrum where devices are sharing the same spectrum using a set of predetermined rules aimed at insuring fair spectrum access; and
  Use shared spectrum, e.g., Licensed Shared Access (LSA) or Authorized shared access (ASA), which usually proposes a division of rights of use, based on time of use or geographical constraints between mobile operators and possibly an incumbent user.

Embodiments of the present disclosure are concerned with at least the third (last) approach, which proposes a shared spectrum approach. A typical use of the third scenario is to enable use of a band that is available for licensed users in some markets, but is being restricted in others because of incumbents, such as radar or satellite systems. Incumbent systems can be protected around the area of deployment, while authorization for mobile infrastructure can be granted in such a way that aggregate interference from mobile systems towards the incumbent is limited to an acceptable level of noise rise or performance degradation. In LSA, the mobile operator is licensed to operate in permitted or authorized areas, and is the reasonable regulatory approach to ASA.

The introduction of Licensed Shared Access (LSA) in the 2.3 GHz band will allow binary sharing between the incumbent, namely terrestrial radar stations in, for example, France, and Long-Term Evolution (LTE) with the aid of a spectrum repository known as the LSA repository. Such regulation aims at unlocking spectrum designated as an International Mobile Telecommunications (IMT) band in the International Telecommunications Union (ITU) in markets, and subsequently offered a band designation in 3GPP, namely Band 40.

The creation in the United States of America (USA) of the new Citizens Broadband Radio Service (CBRS) in the 3.5 GHz band, currently occupied by incumbents like the Department of Defense, for example, will add much-needed capacity to meet the ever-increasing demands of wireless innovation. The CBRS represents a more aggressive application of ASA to spectrum, where in addition to long-term geographic licenses shared with incumbents, multiple operators may also coexist in close geographical proximity to one another.

Sharing in the 3.5 GHz band occurs between three tiers of users, with higher tiers being accorded lower priority. Access to the spectrum is governed by a Spectrum Access System (SAS) that implements a geolocation database and policy management function to be used to protect incumbents as well as implement a tiered access framework. Incumbent users represent the highest tier in this framework and receive interference protection from Citizens Broadband Radio Service users. Protected incumbents include the federal operations described above, as well as, Fixed Satellite Service (FSS) and, for a finite period, grandfathered terrestrial wireless operations in the 3650-3700 MHz portion of the band. The Citizens Broadband Radio Service itself includes two tiers—Priority Access (PA) and General Authorized Access (GAA)—both authorized in any given location and frequency by an SAS. As the name suggests, Priority Access operations receive protection from GAA operations. Priority Access Licenses (PALs), defined as an authorization to use a 10 megahertz channel in a single census tract for three years, will be assigned in up to 70 megahertz of the 3550-3650 MHz portion of the band. GAA use will be allowed, by rule, throughout the 150 megahertz band. GAA users will receive no interference protection from other Citizens Broadband Radio Service users. The band has been designed for deployment of small cells, al- FIG. 1 illustrates the spectrum anatomy for the 3.5 GHz Citizens Broadband Radio Service. A Citizens Broadband Radio Service Device (CBSD) will first register with the SAS and provide its location information among other registration parameters, and then it will ask the SAS to grant access in a certain channel. Before granting access, the SAS will use information from the Environmental Sensing Capability (ESC) network to detect incumbent activity in the area where the CBSD operates. The SAS will also use measurement reports from the other CBSDs in the same area to determine the level of interference in a certain channel, as well as, if the channel needs to be protected due to PAL user activity.

SUMMARY

Some embodiments advantageously provide a method and apparatus for interference allocation, and, in particular, for distribution of an interference quota based on identifying network node clusters.

Other embodiments of the present disclosure may provide solutions to at least the following problems. Coexistence in unlicensed channels has traditionally been managed with distributed algorithms using carrier sensing techniques, such as, for example, the Listen Before Talk (LBT) algorithm used by WiFi.

Certain aspects and their embodiments of the present disclosure may provide solutions to these or other problems.

Embodiments of the present disclosure provide new coexistence algorithms that are technology neutral, which is particularly advantageous in a centralized Spectrum Access System (SAS) in the CBRS band.

For example, embodiments of the present disclosure propose a coexistence management method for the CBRS spectrum. The method may be implemented in the centralized Spectrum Access System (SAS) and may be applied to access the "General Authorized Access (GAA)" available spectrum.

In some embodiments, the CBSD may obtain a grant from an SAS before starting transmitting in a channel. The grant may be obtained even for GAA channels. The serving SAS may receive the CBSD grant request and evaluate if the services provided by the CBSD requesting the grant will provide higher value than the impact/interference that the CBSD will cause to the other CBSDs operating in the same area.

The SAS already has the mandate to protect incumbent and PAL users from interference caused by GAA users. Thus, some of the embodiments in the present disclosure may also allow the SAS to arbitrate the impact between GAA users.

According to some embodiments, a User Value (UV) function is introduced to indicate the value that the CBSD will provide to an end user device (EUD). The UV function may be used to evaluate the average user value in the coverage area of the CBSD before and after the CBSD is allowed to transmit. In one embodiment, the CBSD grant is approved only if the positive effect of introducing the CBSD surpasses the negative impact.

According to some embodiments, the SAS further uses several methods to mitigate interference between network nodes.

In the following, the term 'optional' is used to characterize features (e.g. steps or structures), that may be present in some, but not all embodiments of certain proposed aspects of the present disclosure.

In a first aspect, a method in a controlling node (e.g., SAS) is provided. Embodiments of the method according to the first aspect may include steps of:
  Step A: receiving a request from a network node for a grant of resources in a shared spectrum;
  Step B: in response to the request, determining an interference value based on the grant of the resources to the network node; and
  Step C: in response to determining that the interference value satisfies a threshold, granting the resources to the network node.

According to other aspects, a controlling node comprising circuitry is provided. The circuitry may include one or more processors and memory. The controlling node may be operable to perform steps according to embodiments of methods disclosed herein, according to the various aspects.

According to further aspects, computer programs, computer readable media configured to process and/or store instructions for steps according to embodiments of methods disclosed herein, according to the various aspects, are also provided.

Certain embodiments of aspects of the present disclosure may provide one or more technical advantages, including enabling sharing the available GAA spectrum between CBSD devices independent of the technology being used by each device.

According to one aspect of the present disclosure, a method in a controlling node for distribution of an interference quota (IQ) among a plurality of network nodes is provided. The method includes identifying a number of network node clusters, a network node cluster defined as a group out of the plurality of network nodes being located within a predetermined distance of each other; dividing the IQ by the number of network node clusters to provide a cluster quota; and distributing the cluster quota among each network node within each identified network node cluster.

According to this aspect, in some embodiments, the IQ is distributed among at least one of Priority Access License (PAL) channels and General Authorized Accessed (GAA) channels. In some embodiments, the method includes using a first IQ for the PAL channels and a second IQ for the GAA channels. In some embodiments, the method includes if at least a first condition is met: using a common IQ for the GAA channels and the PAL channels; and if at least a second condition is met: using a first IQ for the PAL channels and a second IQ for the GAA channels, the first IQ being different than the second IQ. In some embodiments, the method includes, as result of determining that at least one GAA channel has been introduced in at least one PAL channel, if the number of GAA channels is greater than the number of PAL channels, using a first IQ for the PAL channels and a second IQ for the GAA channels. In some embodiments, the method includes, if a number of GAA channels is equal to or less than a number of PAL channels: using a common IQ for the GAA channels and the PAL channels; and if the number of GAA channels is greater than the number of PAL channels: using a first IQ for the PAL channels and a second IQ for the GAA channels, the first IQ being different than the second IQ. In some embodiments, the controlling node is a Coexistence Manager. In some embodiments, the controlling node is a Spectrum Access System (SAS) and the network node is a Citizen's Broadband radio Service Device (CBSD). In some embodiments, the method includes, for each of the network node clusters, dividing the cluster quota by a number of network nodes within the network node cluster to provide a network node quota. In some embodiments, distributing the cluster quota among each network node within each identified network node cluster includes equally distributing the cluster quota to the network nodes within the corresponding network node cluster.

According to another aspect of the present disclosure, a controlling node configured to distribute an interference quota (IQ) among a plurality of network nodes is provided. The controlling node includes processing circuit configured to: identify a number of network node clusters, a network node cluster defined as a group out of the plurality of network nodes being located within a predetermined distance of each other; divide the IQ by the number of network node clusters to provide a cluster quota; and distribute the cluster quota among each network node within each identified network node cluster.

According to this aspect, in some embodiments, the processing circuitry is configured to distribute the IQ among at least one of Priority Access License, PAL, channels and General Authorized Accessed, GAA, channels. In some embodiments, the processing circuitry is configured to use a first IQ for the PAL channels and a second IQ for the GAA channels. In some embodiments, the processing circuitry is configured to, if at least a first condition is met: using a common IQ for the GAA channels and the PAL channels; and if at least a second condition is met: using a first IQ for the PAL channels and a second IQ for the GAA channels, the first IQ being different than the second IQ. In some embodiments, the processing circuitry is configured to, as result of determining that at least one GAA channel has been introduced in at least one PAL channel, if the number of GAA channels is greater than the number of PAL channels, using a first IQ for the PAL channels and a second IQ for the GAA channels. In some embodiments, the processing circuitry is configured to: if a number of GAA channels is equal to or less than a number of PAL channels: use a common IQ for the GAA channels and the PAL channels; and if the number of GAA channels is greater than the number of PAL channels: use a first IQ for the PAL channels and a second IQ for the GAA channels, the first IQ being different than the second IQ. In some embodiments, the controlling node is a Coexistence Manager. In some embodiments, the controlling node is a Spectrum Access System, SAS, and the network node is a Citizen's Broadband radio Service Device, CBSD. In some embodiments, the processing circuitry is configured to: for each of the network node clusters, divide the cluster quota by a number of network nodes within the network node cluster to provide a network node quota. In some embodiments, distributing the cluster quota among each network node within each identified network node cluster includes equally distributing the cluster quota to the network nodes within the corresponding network node cluster.

According to yet another aspect of the present disclosure, a controlling node configured to distribute an interference quota, IQ, among a plurality of network nodes is provided. The controlling node includes a cluster identification module configured to identify a number of network node clusters, a network node cluster defined as a group out of the plurality of network nodes being located within a predetermined distance of each other; a cluster quota distribution module configured to divide the initial IQ by the number of network node clusters to provide a cluster quota; and a network interface module configured to distribute the cluster quota among each network node within each identified network node cluster.

It is to be noted that any feature of any of the embodiments disclosed herein may be applied to any other embodiment, wherever appropriate. Likewise, any advantage of any of the embodiments may apply to the other embodiments, and vice versa. Certain embodiments may have some, or none of the above advantages. Other advantages will be apparent to persons of ordinary skill in the art. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
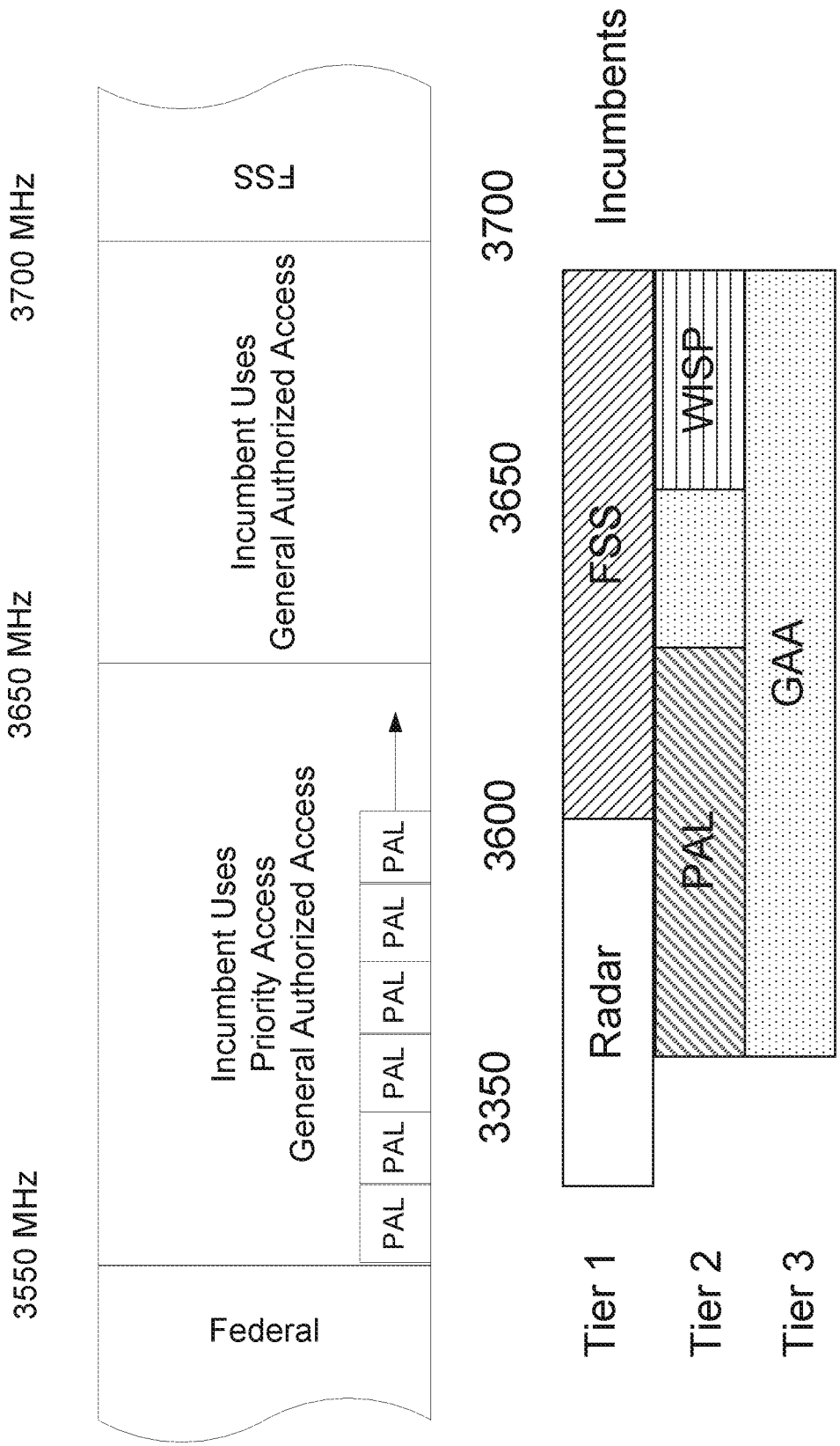
FIG. 1 illustrates the spectrum anatomy for the 3.5 GHz Citizens Broadband Radio Service.

Before describing in detail exemplary embodiments, it is noted that the embodiments reside primarily in combinations of apparatus components and processing steps related to interference allocation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Various features and embodiments will now be described with reference to the figures to fully convey the scope of the disclosure to those skilled in the art. Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions. Furthermore, in some illustrations, some blocks, functions or actions may be optional and may or may not be executed; these are generally, but not necessarily, illustrated with dashed lines.

Figure 2:
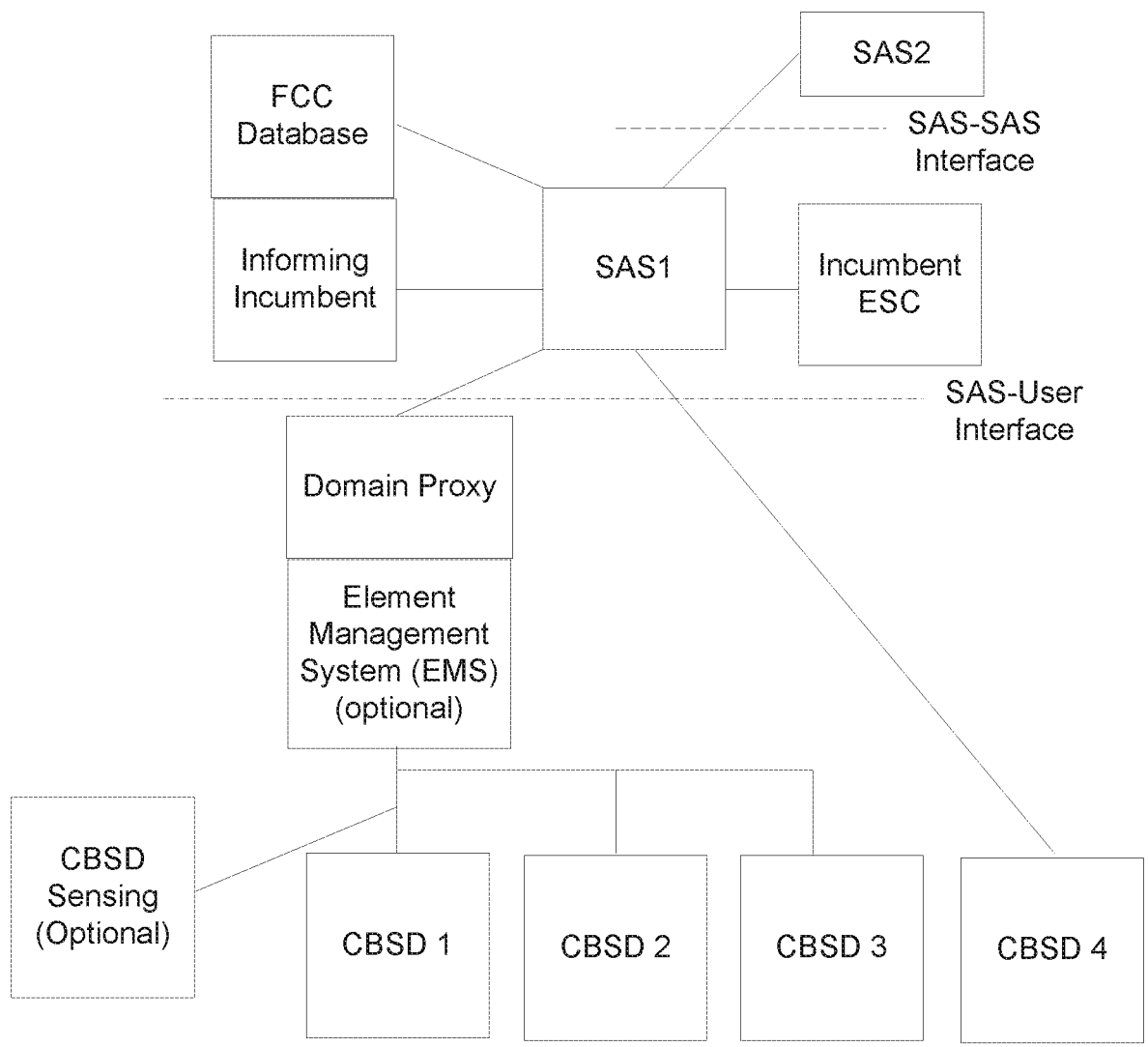
FIG. 2 illustrates the SAS architecture according to one exemplary embodiment of the present disclosure.

Embodiments of the present disclosure are concerned with at least the third (last) approach described above, which proposes a shared spectrum approach. An exemplary SAS architecture is depicted in FIG. 2 for the 3.5 GHz band. The SAS may be considered a central entity or system for coordinating, authorizing and managing use of the CBRS spectrum, protecting higher tier operations from interference, and maximizing frequency capacity for all CBRS operators. The SAS may be referred to, in some embodiments, as a controlling node. The SAS administrators may be permitted to charge CBRS operators fees for registration and frequency coordination services. There may be one or more SAS, such as SAS1 and SAS2 connected to each other.

As illustrated in FIG. 2, for example, SAS1 is also connected to FCC databases, an Environmental Sensing Capability (ESC) system for incumbent detection, an informing incumbent system, a domain proxy and CBSDs (e.g., CBSD4). The Domain Proxy can be optionally connected to an Element Management System (EMS). The EMS can be connected to a plurality of CBSDs, such as CBSD1, CBSD2, CBSD3, etc. Each CBSD domain may optionally include some sensing capability systems (e.g., CBSD sensing).

Currently, the FCC requires that transmission equipment with specific, standardized capabilities be employed by CBRS operators for use in the 3.5 GHz band. This equipment is called Citizens Broadband Service Device ("CBSD"). CBDSs are generally fixed base stations/access points, such as, an LTE Evolved Universal Terrestrial Radio Access Network (E-UTRAN) Node Bs (also commonly denoted as evolved Node Bs, enhanced Node Bs, eNodeBs, or eNBs). There are two types of CBDSs: Category A (a lower power CBSD) and Category B (a higher power CBSD). The CBSDs can, in some embodiments, only operate under the authority and management of a centralized Spectrum Access System.

CBRS end user devices may be controlled by an authorized CBSD. End User Devices (EUD) may have the capability to receive and decode information from a CBSD. The users may access a communication network through one or more CBSDs and, when the CBSD is granted permission from the SAS, may use resources within the shared band.

Some of the SAS' functionalities may include the following:
Determine and provide to CBSDs the permissible channels or frequencies at their location.
Determine and provide to CBSDs the maximum permissible transmission power level at their location.
Communicate with the ESC to obtain information about federal Incumbent User transmissions and instruct CBSDs to move to another frequency range or cease transmissions.
Ensure that CBSDs operate in geographic areas and within the maximum power levels required to protect federal Incumbent Users from harmful interference.
Register and authenticate the identification information and location of CBSDs.
Ensure that CBSDs protect non-federal Incumbent Users from harmful interference.
Protect Priority Access Licensees from interference caused by other PALs and from General Authorized Access Users.
Facilitate coordination between GAA users operating Category B CBSDs.
Resolve conflicting uses of the band while maintaining, as much as reasonably possible, a stable radio frequency environment.
Ensure secure and reliable transmission of information between the SAS and CBSDs.
Protect Grandfathered Wireless Broadband Licensees.
Implement the terms of current and future international agreements as they relate to the Citizens Broadband Radio Service.

The ESC may monitor for incumbent radar activity in coastal areas and near inland military bases. For example, the ESC can employ spectrum sensing technologies in conjunction with the SAS, in order to allow CBRS users to operate near coastlines on frequencies not being used by the federal radar systems. When incumbent activity is detected, the ESC may communicate that information to, for example, SAS1. The SAS or SASs may reconfigure local devices within 60 seconds to avoid interfering with the detected incumbent radars, for example.

The FCC databases include information related to commercial users and corresponding licenses (e.g., site-based licensing information). SAS1 and SAS2 may be capable of directly interfacing with the FCC databases to access information used for SAS operations.

The Domain Proxy may be considered a managing intermediary. A Domain Proxy's function may include, for example:
Accepting a set of one or more available channels and selecting channels for use by specific CBSDs, or alternatively, pass the available channels to the carrier EMS for CBSD channel selection;
EMS may optionally be co-located with the domain proxy;
Back reporting selected channels to SAS optionally received via EMS;
Receiving confirmation of channel assignment from SAS;
Performing bidirectional bulk CBSD registration and directive processing, optionally through carrier EMS if present;
Performing bidirectional information processing and routing; and
Performing other activities, such as, for example, interference reporting, etc.

When sharing spectrum resources between devices and networks using different technologies, one of the most important questions raised is about fairness. If only one device provides service in an area, then the device can use all the available spectrum. However, if multiple devices are present in the same area, a method may be required to divide spectrum resources between devices or clusters of devices, either in the time domain or in the frequency domain, or alternatively in a manner where the signal quality between a base station device and its end-user devices is sufficiently higher than the aggregate interference offered by other authorized base station devices and their respective end user clients or subscribers, respectively.

Several metrics can be used for fairness assessment, summarized as follows:
Assigned spectrum bandwidth:
Each device gets access to an equal amount of spectrum resources.
Each network of devices gets access to an equal amount of spectrum resources.
Provided Coverage:
Each device or group of coordinated network nodes gets access to spectrum resources proportional to the provided coverage.
Density of CBSDs or EUDs:
Each device or group of coordinated network nodes is provided access to spectrum resources proportional to the density of CBSDs and/or EUDs in a given area. In some cases, this metric can also be adapted to a 3-dimensional volume for enterprise type deployments.
Each device is provided bandwidth in proportion to the coverage area of the individual node for the maximum Effective Isotropic Radiated Power (EIRP) of the device within the limits in the band, e.g., 47 dBm/10 MHz for a category B CBSD authorized within the CBRS.

Proportional to number of grants per unit area:
Each device or coordinated group of devices is provided access to spectrum resources proportional to the number of grants per unit area that the serving SAS or Coexistence Manager (CxM) approves.

Number of served EUDs:
Each device gets access to spectrum resources proportional to the served number of End User Devices (EUDs).

Spectral efficiency:
The devices with higher spectral efficiency get access to a larger amount of spectrum. This will encourage better utilization of spectrum resources.

Application level goodput:
Each device gets access to spectrum resources proportional to the provided good application throughput.

Interference generated towards other in-band/out-of-band users:
Devices with lower interference level get access to larger amount of spectrum.

Interference generated by a co-existence group to other co-existence groups:
Spectrum resources are allocated to a given co-existence group based on the maximum aggregate interference generated by all EUDs and/or network nodes within the co-existence group, which is seen or impacts devices and/or network nodes in other co-existence groups.

Another factor in deciding the spectrum sharing algorithm is the behavior of a device which is integrated in a network. For example, LTE may require the devices belonging to the same network to have a common channel used for mobility.

Figure 3:
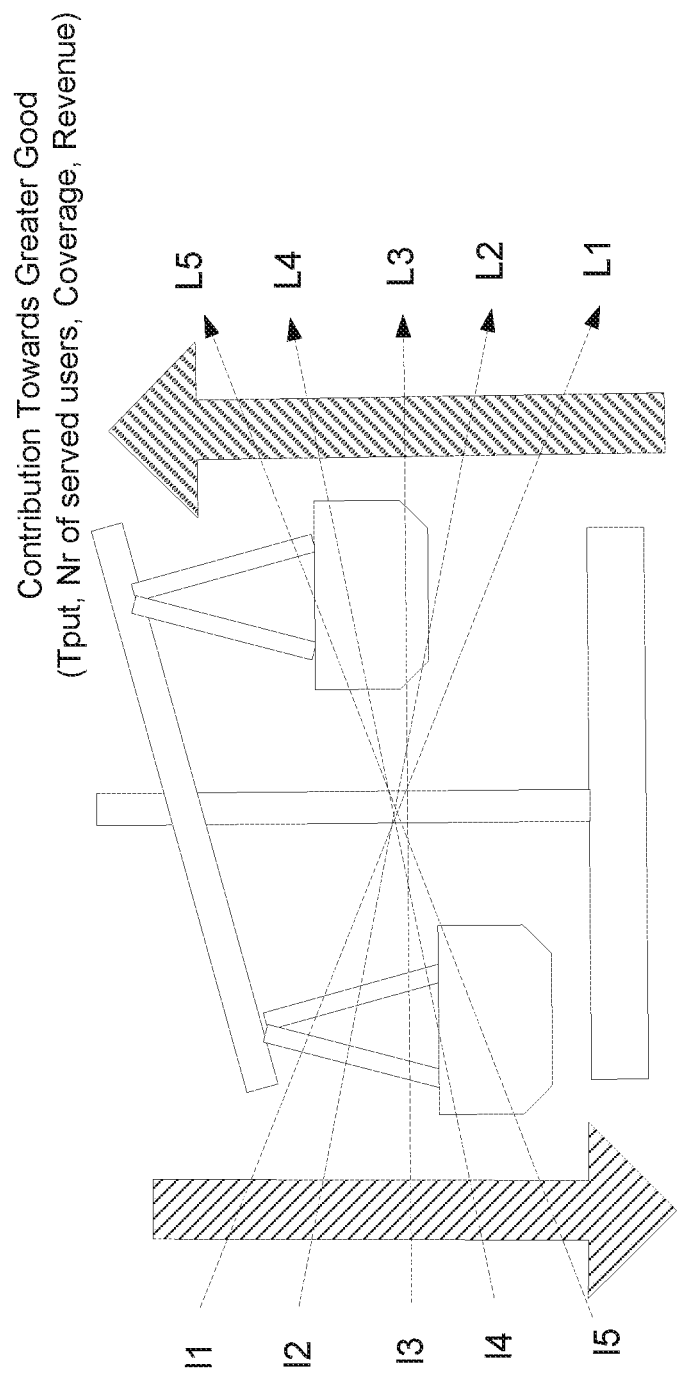
FIG. 3 illustrates the fairness balance concept.

To generalize, a fairness balance may be achieved between the contribution of a device to the "greater good" and the impact of the device towards the other devices operating in the same area. For example, FIG. 3 illustrates the fairness balance concept according to one embodiment of the present disclosure.

Figure 4:
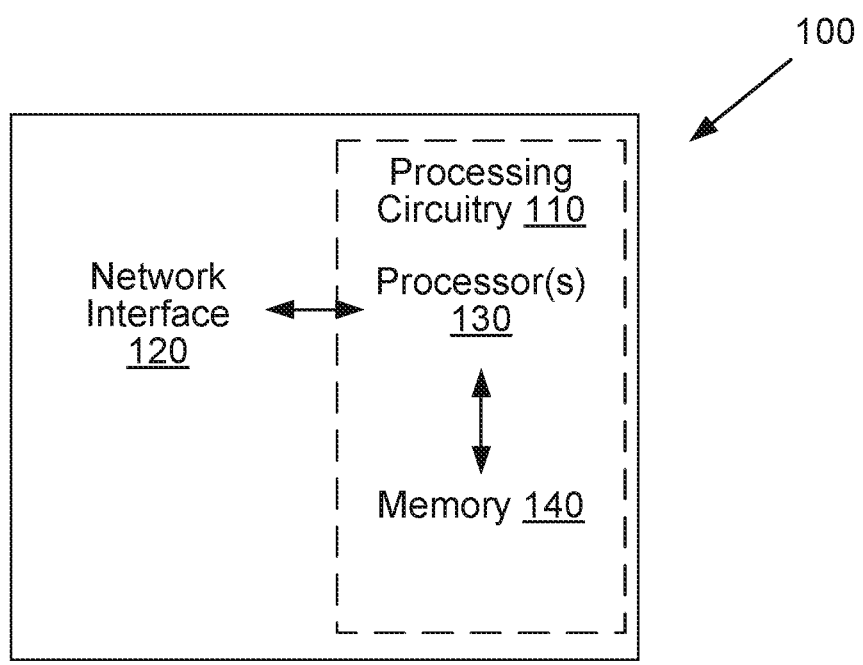
FIG. 4 is a schematic illustration of a controlling node, according to an embodiment of the present disclosure.

FIG. 4 is a block diagram of an exemplary controlling node 100, such as, for example, SAS1, that may be used for allowing wireless communications in a shared spectrum. The controlling node 100 includes a processing circuitry 110, and a network interface 120. The circuitry 110 may include one or more (node) processors 130, and memory 140. In some embodiments, the one or more processors 130 executes the methods described herein, such as, for example, the methods described with reference to the flowcharts in FIGS. 8 and/or 12. The memory 140 stores the instructions for execution by the one or more processors 130, and the network interface 120 communicates signals to the other elements, such as the FCC databases, the CBSD, the ESC, the domain proxy, etc.

The one or more processors 130 may include any suitable combination of hardware and software implemented in one or more modules to execute instructions and manipulate data to perform some or all of the described functions of the SAS, such as those described herein. In some embodiments, the one or more processors 130 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 130 may comprise one or more of the modules discussed below with respect to FIG. 5 and/or FIG. 6.

The memory 140 is generally operable to store instructions, such as a computer program, software, an application including one or more of logic, rules, algorithms, code, tables, etc. and/or other instructions capable of being executed by one or more processors 130. Examples of memory 140 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 120 is communicatively coupled to the one or more processors 130 and may refer to any suitable device operable to receive input for the controlling node 100, send output from the controlling node 100, perform suitable processing of the input or output or both, communicate to other devices, or any combination of the preceding. The network interface 120 may include appropriate hardware (e.g., port, modem, network interface card, etc.) and software, including protocol conversion and data processing capabilities, to communicate through a network.

Other embodiments of the controlling node 100 may include additional components beyond those shown in FIG. 4 that may be responsible for providing certain aspects of a SAS' functionality, including any of the functionality described herein and/or any additional functionality (including any functionality necessary to support the solutions described herein).

Processors, interfaces, and memory similar to those described with respect to FIG. 4 may be included in other network nodes. Other network nodes may optionally include or not include a wireless interface. Functionalities described herein could reside within the same node or could be distributed across a plurality of nodes and network nodes.

In one embodiment, controlling node 100 is an SAS and the network node is a CBSD.

In another embodiment, controlling node 100 is configured to distribute an initial interference quota (IQ) among a plurality of network nodes. Controlling node 100 includes processing circuitry 110 including a memory 140 and a processor 130, the memory 140 in communication with the processor 130. Memory 140 has instructions that, when executed by processor 130, configure processor 130 to identify a number of network node clusters, a network node cluster defined as a group out of the plurality of network nodes being located within a predetermined distance of each other, and divide the initial IQ by the number of network node clusters to provide a cluster quota. Controlling node 100 also includes a network interface 120 configured to distribute the cluster quota among each network node within each identified network node cluster.

In one embodiment, the initial IQ is distributed among PAL channels and GAA channels.

In one embodiment, processor 130 of controlling node 100 is further configured to, if a number of GAA channels is equal to or less than a number of PAL channels, use a common IQ for the GAA channels and the PAL channels, and if the number of GAA channels is greater than the number of PAL channels, use a first IQ for the PAL channels ($IQ_{PAL}$) and a second IQ for the GAA channels ($IQ_{GAA}$), wherein $IQ_{PAL}$ is different than $IQ_{GAA}$.

Figure 5:
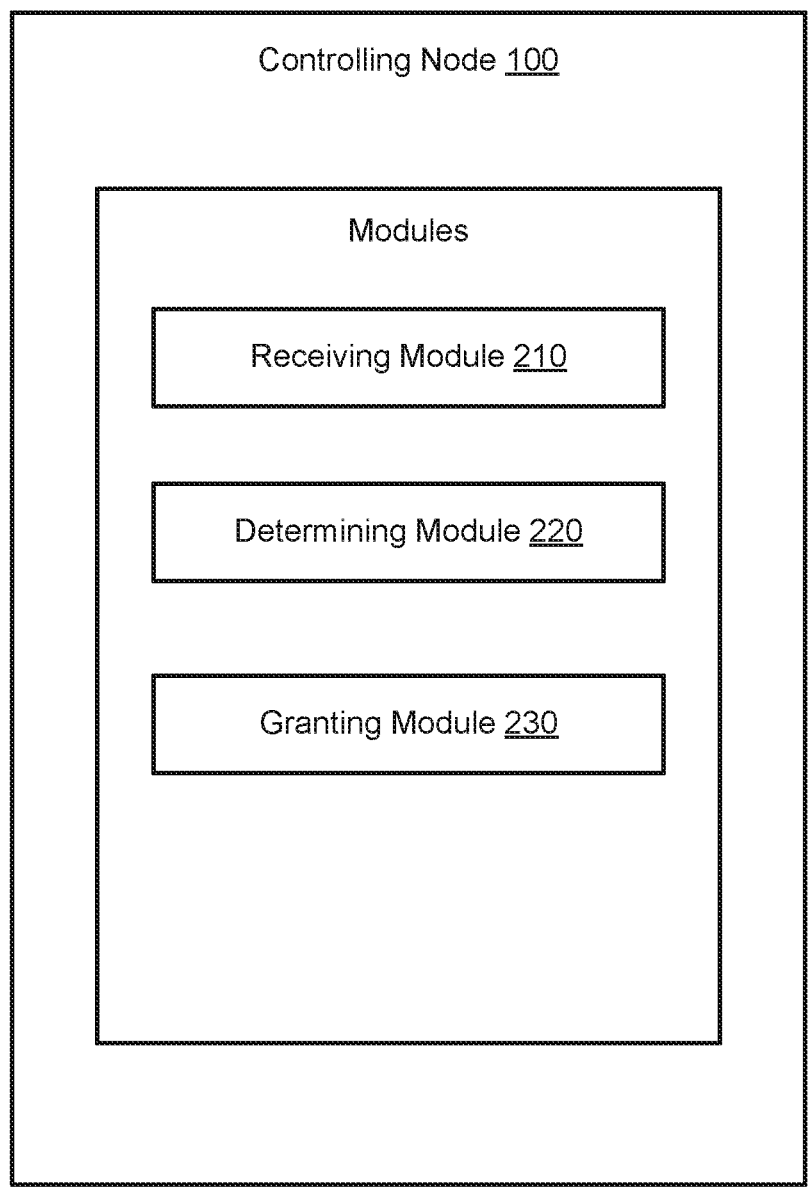
FIG. 5 is a schematic illustration of a controlling node, according to another embodiment of the present disclosure.

FIG. 5 illustrates another example of a controlling node 100 in accordance with another embodiment. The controlling node 100 could be a SAS, for example. The controlling node 100 may include a receiving module 210, a determining module 220 and a granting module 230.

Figure 12:
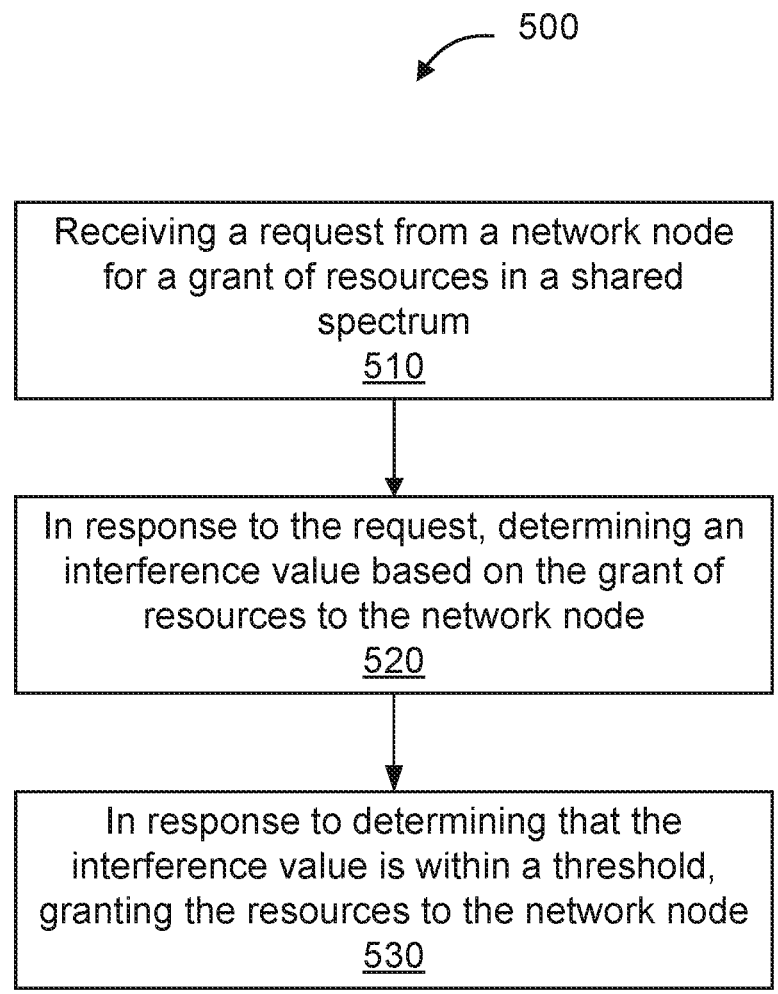
FIG. 12 is a flowchart of a method in a controlling node, according to an embodiment of the present disclosure.

In certain embodiments, the receiving module 210 may perform a combination of steps that may include steps described herein with reference to FIG. 12.

The determining module 220 may perform a combination of steps that may include steps such as steps described herein with reference to FIG. 12.

In certain embodiments, the granting module 230 may perform a combination of steps that may include steps such as steps described herein with reference to FIG. 12.

In certain embodiments, the receiving module 210, the determining module 220 and the granting module 230 may be implemented using one or more processors, such as described with respect to FIG. 4. The modules may be integrated or separated in any manner suitable for performing the described functionality.

Figure 6:
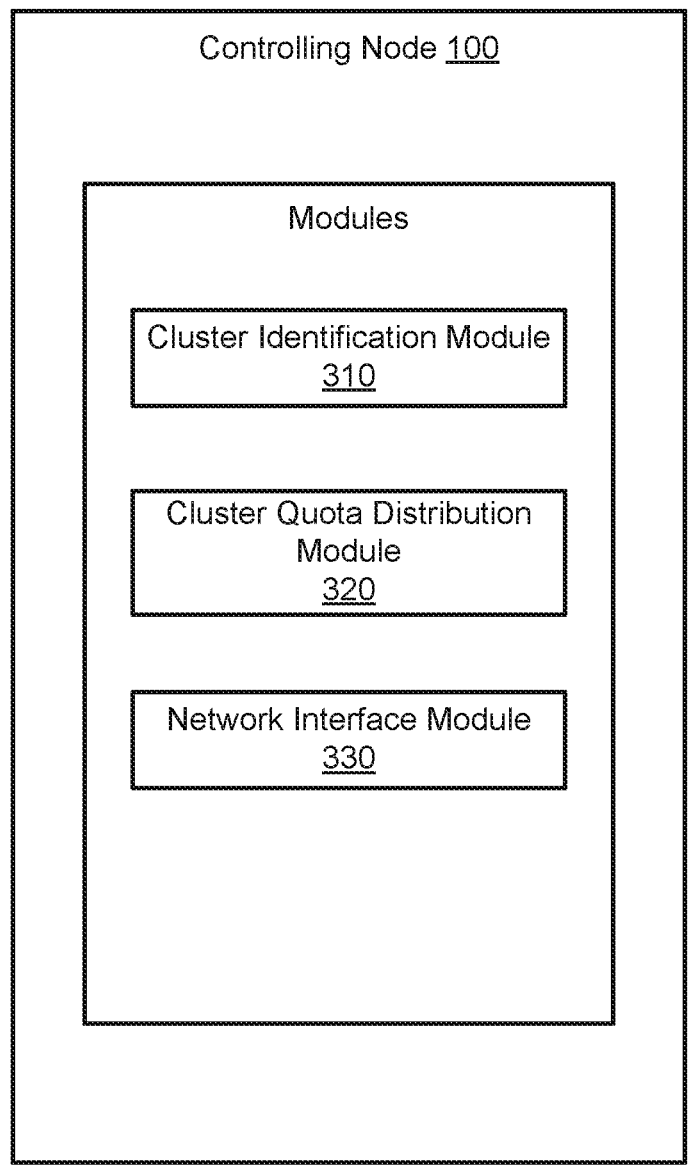
FIG. 6 is a schematic illustration of a controlling node, according to an alternate embodiment of the present disclosure.

Referring to FIG. 6, an alternate controlling node 100 is depicted. In one embodiment, controlling node 100 is an SAS and the network node is a CBSD. In one embodiment, controlling node 100 is configured to distribute an initial interference quota (IQ) among a plurality of network nodes. Controlling node 100 includes a cluster identification module 310 configured to identify a number of network node clusters, a network node cluster defined as a group out of the plurality of network nodes being located within a predetermined distance of each other, a cluster quota distribution module 320 configured to divide the initial IQ by the number of network node clusters to provide a cluster quota, and a network interface module 330 configured to distribute the cluster quota among each network node within each identified network node cluster. In other embodiments, the controlling node depicted in FIG. 6 may be implemented using one or more processors, such as those described with respect to FIG. 4.

It should be noted that according to some embodiments, virtualized implementations of the controlling nodes 100 of FIGS. 4-6 and of the CBSDs are possible. As used herein, a "virtualized" network node or controlling node (e.g., a virtualized base station or a virtualized radio access node or a SAS) is an implementation of the network node or controlling node in which at least a portion of the functionality of the network node/controlling node is implemented as a virtual component (e.g., via a virtual machine(s) or container(s) executing on a physical processing node(s) in a network(s)). As such, the functions of the controlling node 100 (described hereinabove) could be distributed across a cloud computing system in some embodiments.

One aspect of the present disclosure describes use cases where the 1/N (N representing the number of CBSDs) assignment of the interference budget can create significant impact to a PAL CBSD in certain scenarios, such as, for example, when a dense cluster of indoor CBSDs is introduced. In other words, 1/N refers to an assignment of spectrum that is proportional to the number of CBSDs, which in some scenarios can impact a PAL CBSD. Embodiments of this aspect of the present disclosure may focus on PAL protection.

Figure 7:
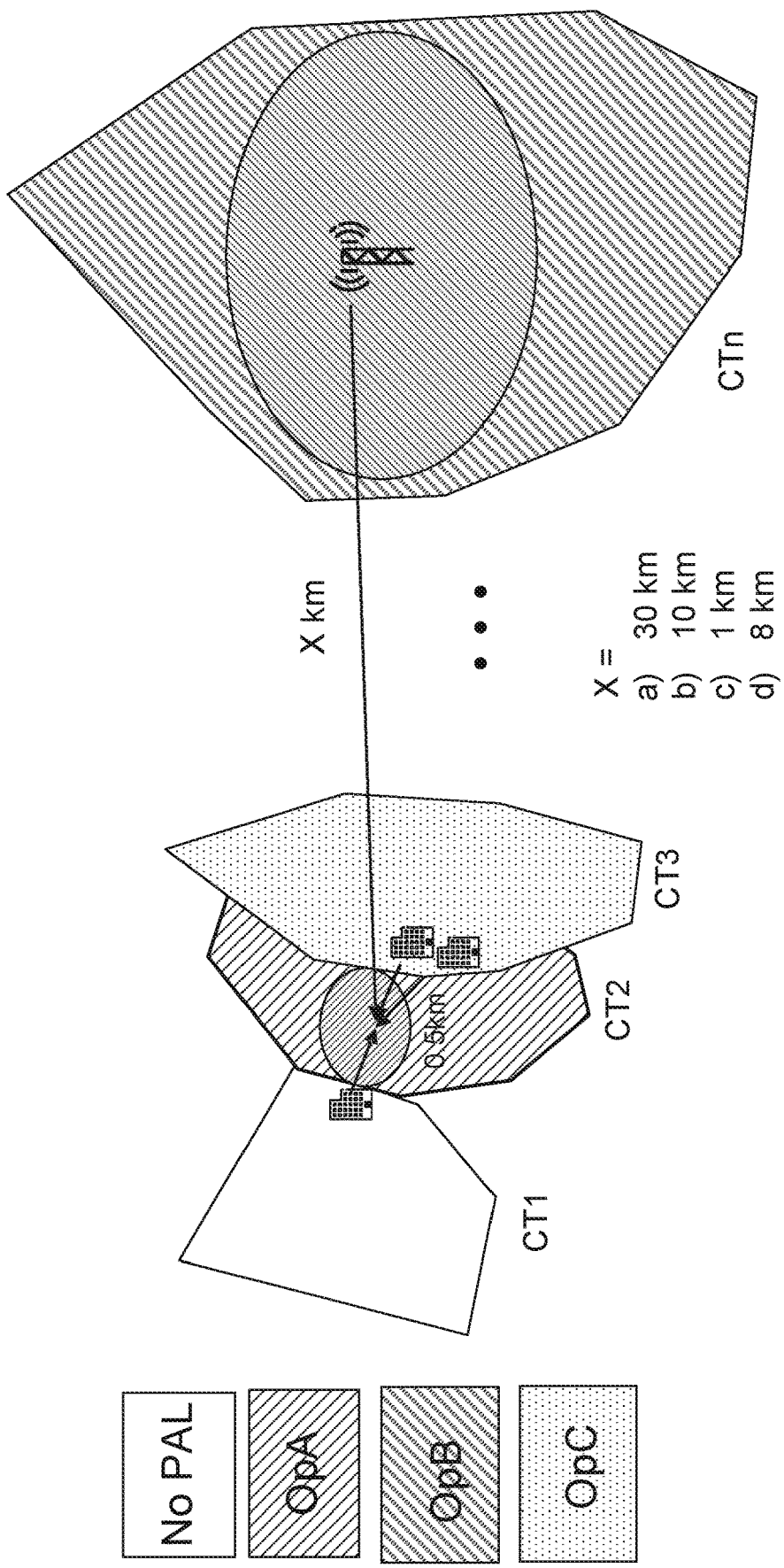
FIG. 7 is a use case map, illustrating several use cases according to an embodiment of the present disclosure.

For example, a random chosen PAL channel may be used, e.g., ch3 (10 MHz wide) 3570 MHz-3580 MHz. FIG. 7 represents an exemplary use case map and is used to illustrate the various use cases described below. Referring to FIG. 7, there may be several Census Tracks (CT), as follows:

CT1—no PAL license available for ch3;
CT2—Operator A (OpA) has the PAL license for ch3 and has defined a PAL Protection Area (PPA);
CT3—Operator C (OpC) has the PAL license for ch3; and
CTn—Operator B (OpB) has the PAL license for ch3.

Other use case assumptions in the illustrative embodiment may include:
6 floor building, 10 Category A ("Cat A") CBSDs per floor=60 CBSDs per building;
Wall penetration loss of 30 dB;
Several Path Losses (PL) used:
  Free space PL
  Dual slope PL
  Urban PL
  Irregular Terrain Model (ITM) Area Mode, 50% confidence level It should be noted that the values used herein for the exemplary use case are for illustrative purposes and are not necessarily intended to indicate a typical scenario.

First Use Case (Free Space PL)
  Step 1
  OpB has one PAL grant in ch3 for CTn and transmits at $P_B$=47 dBm EIRP
  Step 2
  OpA deploys a micro cell in CT2 and defines a PPA
  The interference quota for protecting the PPA is $IQ_{N=1}$= −80 dBm
  $D_{B-A}$=30 km
  The interference from OpB towards the OpA's PPA is $I_{B->A}$(47 dBm, 30 km)=−86.05 dBm
  The OpB CBSD can continue to transmit at 47 dBm
  Step 3
  OpC deploys 120 Cat A CBSDs with $P_C$=17 dBm EIRP per CBSD, in 2 buildings in CT3
  The new interference quota for protecting the PPA is $IQ_{N=121}$=−100.8 dBm
  $D_{C-A}$=0.5 km and $I_{C->A}$((17 dBm-30 dB), 0.5 km)= −107.49 dBm
  OpC CBSDs can transmit at $P_C$=17 dBm
  OpB CBSD exceeds the interference quota and must reduce power to $P_B$=32.22 dBm, a difference of 14.8 dB
  Step 4
  OpC deploys 60 CatA CBSD in a building in CT1 and requests GAA grants for ch3
  The quota rule changes from $$\frac{80 \text{ dBm}}{N} \text{ to } \frac{80 \text{ dBm}}{2*N_{PAL}} \text{ and } \frac{80 \text{ dBm}}{2*N_{GAA}}$$

The new PAL quota for protecting OpA PPA is $IQ_{N\_PAL=121}$=−103.8 dBm
  OpC CBSDs can continue to transmit at $P_C$=17 dBm
  OpB CBSD exceeds the interference quota and must further reduce power with an additional 3 dB to $P_B$=29.22 dBm, a difference of 17.8 dB as compared to step 2
Second Use Case (Dual Slope PL)
  Step 1
  OpB has one PAL grant in ch3 for CTn and transmits at $P_B$=47 dBm EIRP
  Step 2
  OpA deploys a micro cell in CT2 and defines a PPA
  The interference quota for protecting the PPA is $IQ_{N=1}$= −80 dBm
  $D_{B-A}$=10 km The interference from OpB towards the OpA's PPA is
  $I_{B->A}$(47 dBm, 10 km)=−91.46 dBm
The OpB CBSD can continue to transmit at 47 dBm
Step 3
OpC deploys 120 Cat A CBSDs with $P_C$=17 dBm EIRP per CBSD, in 2 buildings in CT3
The new interference quota for protecting the PPA is $IQ_{N=121}$=−100.8 dBm
$D_{C-A}$=0.5 km and $I_{C->A}$((17 dBm-30 dB), 0.5 km)=−107.49 dBm
OpC CBSDs can transmit at $P_C$=17 dBm
OpB CBSD exceeds interference quota and must reduce power to $P_B$=37.64 dBm, a difference of 9.36 dB
Step 4
OpC deploys 60 CatA CBSD in a building in CT1 and requests GAA grants for ch3
The quota rule changes from $$\frac{80 \text{ dBm}}{N} \text{ to } \frac{80 \text{ dBm}}{2*N_{PAL}} \text{ and } \frac{80 \text{ dBm}}{2*NGAA}$$

The new PAL quota for protecting OpA PPA is $IQ_{N\_PAL=121}$=−103.8 dBm
OpC CBSDs can continue to transmit at $P_C$=17 dBm
OpB CBSD exceeds the interference quota and must further reduce power with an additional 3 dB to $P_B$=34.64 dBm, a difference of 12.36 dB as compared to step 2

Third Use Case (Urban PL)
Step 1
OpB has one PAL grant in ch3 for CTn and transmits at $P_B$=47 dBm EIRP
Step 2
OpA deploys a micro cell in CT2 and defines a PPA
The interference quota for protecting the PPA is $IQ_{N=1}$=−80 dBm
$D_{B-A}$=1 km
The interference from OpB towards the OpA's PPA is
  $I_{B->A}$(47 dBm, 1 km)=−102.57 dBm
The OpB CBSD can continue to transmit at 47 dBm
Step 3
OpC deploys 120 Cat A CBSDs with $P_C$=17 dBm EIRP per CBSD, in 2 buildings in CT3
The new interference quota for protecting the PPA is $IQ_{N=121}$=−100.8 dBm
$D_{C-A}$=0.5 km and $I_{C->A}$((17 dBm-30 dB), 0.5 km)=−147.54 dBm
OpC CBSDs can transmit at $P_C$=17 dBm
The OpB CBSD can continue to transmit at 47 dBm
Step 4
OpC deploys 60 CatA CBSD in a building in CT1 and requests GAA grants for ch3
The quota rule changes from $$\frac{80 \text{ dBm}}{N} \text{ to } \frac{80 \text{ dBm}}{2*NPAL} \text{ and } \frac{80 \text{ dBm}}{2*NGAA}$$

The new PAL quota for protecting OpA PPA is $IQ_{N\_PAL=121}$=−103.8 dBm
OpC CBSDs can continue to transmit at $P_C$=17 dBm
OpB CBSD exceeds the interference quota and must reduce power $P_B$=45.73 dBm, a difference of 1.27 dB as compared to step 2

Fourth Use Case (ITM Area Mode, 50% Confidence Level)
Step 1
OpB has one PAL grant in ch3 for CTn and transmits at $P_B$=47 dBm EIRP
Step 2
OpA deploys a micro cell in CT2 and defines a PPA
The interference quota for protecting the PPA is $IQ_{N=1}$=−80 dBm
$D_{B-A}$=8 km
The interference from OpB towards the OpA's PPA is
  $I_{B->A}$(47 dBm, 8 km)=−98.40 dBm
The OpB CBSD can continue to transmit at 47 dBm
Step 3
OpC deploys 120 Cat A CBSDs with $P_C$=17 dBm EIRP per CBSD, in 2 buildings in CT3
The new interference quota for protecting the PPA is $IQ_{N=121}$=−100.8 dBm
$D_{C-A}$=0.5 km and $I_{C->A}$((17 dBm-30 dB), 0.5 km)=−107.49 dBm
OpC CBSDs can transmit at $P_C$=17 dBm
OpB CBSD exceeds the interference quota and must reduce power to $P_B$=44.57 dBm, a difference of 2.43 dB
Step 4
OpC deploys 60 CatA CBSD in a building in CT1 and requests GAA grants for ch3
The quota rule changes from $$\frac{-80 \text{ dBm}}{N} \text{ to } \frac{-80 \text{ dBm}}{2*NPAL} \text{ and } \frac{-80 \text{ dBm}}{2*NGAA}$$

The new PAL quota for protecting OpA PPA is $IQ_{N\_PAL=121}$=−103.8 dBm
OpC CBSDs can continue to transmit at $P_C$=17 dBm
OpB CBSD exceeds the interference quota and must further reduce power with an additional 3 dB to $P_B$=41.56 dBm, a difference of 5.44 dB as compared to step 2

In one embodiment, introducing dense clusters of indoor CBSDs can significantly reduce the initial interference quota for outdoor CBSDs operating a distance (e.g., kilometers) away in the same channel. Hence, the algorithm for "left over" interference quota re-distribution can, in some embodiments, be essential to avoid lowering the power of outdoor CBSDs. Thus, in some embodiments, such algorithm should be clearly specified (not a SAS private algorithm).

One embodiment for an initial distribution of the interference quota is for the controlling node 100 (e.g., SAS) to identify the clusters of closely located CBSDs and divide the interference by the number of clusters, instead of the number of CBSDs. For example, instead of $$\frac{-80 \text{ dBm}}{N},$$

embodiments or me present disclosure may use $$\frac{-80 \text{ dBm}}{Nclusters}$$

and then, in some embodiments, equally divide the cluster quota by the CBSDs inside the cluster. In the illustrative examples described herein above, when the first GAA CBSD is introduced in a PAL channel, the interference quota for PAL CBSDs is decreased by 3 dB, which is a relatively significant amount.

According, one advantageous embodiment of the present disclosure for initial distribution of the interference quota when both GAA and PAL are present is:

Use a common $$IQ = \frac{-80 \text{ dBm}}{N_{c\_GAA} + N_{c\_PAL}}, \text{ if } N_{C\_GAA} <= N_{C\_PAL}$$

Use different $$IQ_{PAL} = \frac{-80 \text{ dBm}}{2*Nc - PAL} \text{ and } IQ_{GAA} = \frac{-80 \text{ dBm}}{2*N_{c\_GAA}},$$

if $N_{C\_GAA} > N_{C\_PAL}$

Figure 8:
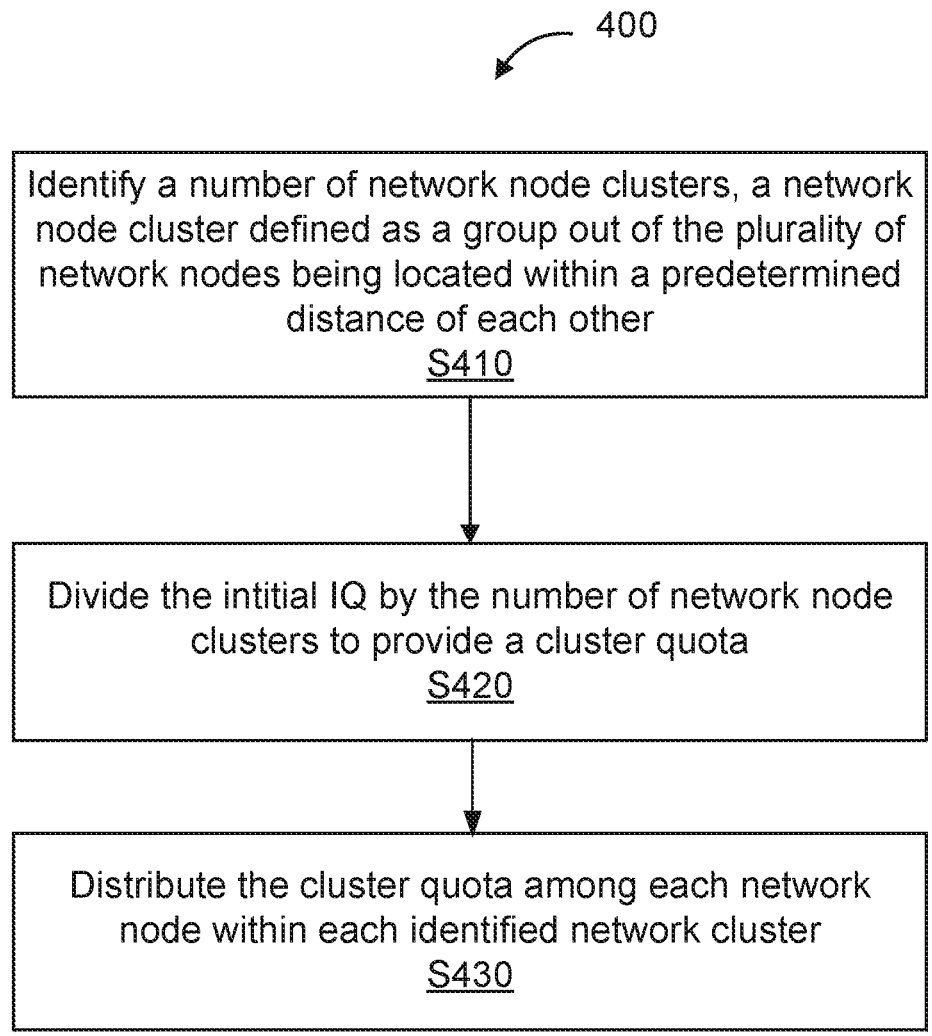
FIG. 8 is a flowchart of a method in a controlling node, according to an alternate embodiment of the present disclosure.

FIG. 8 is a flow diagram illustrating an exemplary method 400 in a controlling node 100 for distribution of an initial interference quota (IQ) among a plurality of network nodes. In one embodiment, the method includes identifying (by, for example, the processor 130 of the controlling node 100) a number of network node clusters, a network node cluster defined as a group out of the plurality of network nodes being located within a predetermined distance of each other (Block S410), divide the initial IQ by the number of network node clusters to provide a cluster quota (Block S420) and distribute the cluster quota among each network node within each identified network node cluster (Block S430).

In one embodiment, the initial IQ is distributed among PAL channels and General GAA channels.

In one embodiment, the method further includes, if a number of GAA channels is equal to or less than a number of PAL channels, a common IQ is used for the GAA channels and the PAL channels. If the number of GAA channels is greater than the number of PAL channels, then a first IQ is used for the PAL channels ($IQ_{PAL}$) and a second IQ is used for the GAA channels ($IQ_{GAA}$), wherein $IQ_{PAL}$ is different than $IQ_{GAA}$.

Having described in detail one aspect of the present disclosure associated with the allocation of interference quotas, a second aspect of the present disclosure will now be described in detail associated with granting resources in a shared spectrum according to, for example, an impact a device may have on other devices and/or network nodes.

According to embodiments of this second aspect, in order to evaluate a device contribution to the greater good, a User Value (UV) function may be used. The UV function may be considered a utility function that expresses the value provided by the CBSD device to an end user device present in a certain location.

One example of the UV function is the throughput provided to an End User Device. Since the user throughput is directly proportional to SINR and SINR value is something that the controlling node 100 (e.g., SAS) can estimate, the proposal for one embodiment of the present disclosure is to use SINR as the UV function. For the devices that are sharing the same channel, the SINR may be based on the actual time that the device is scheduled to transmit in the channel.

Another possible utility function, according to one embodiment, is to employ signal leakage to noise ratio (SLNR), which is a measure of the amount of interference generated by one network node as seen by other network nodes and/or devices. Another variation of the SLNR approach is to define a maximum threshold for the interference to other CBSDs and maximize the SINR at the desired CBSD subject to the maximum interference leakage condition. The SLNR approach may in some embodiments be capable of admitting more diverse use cases, such as, fixed wireless access and backhaul.

Figure 9:
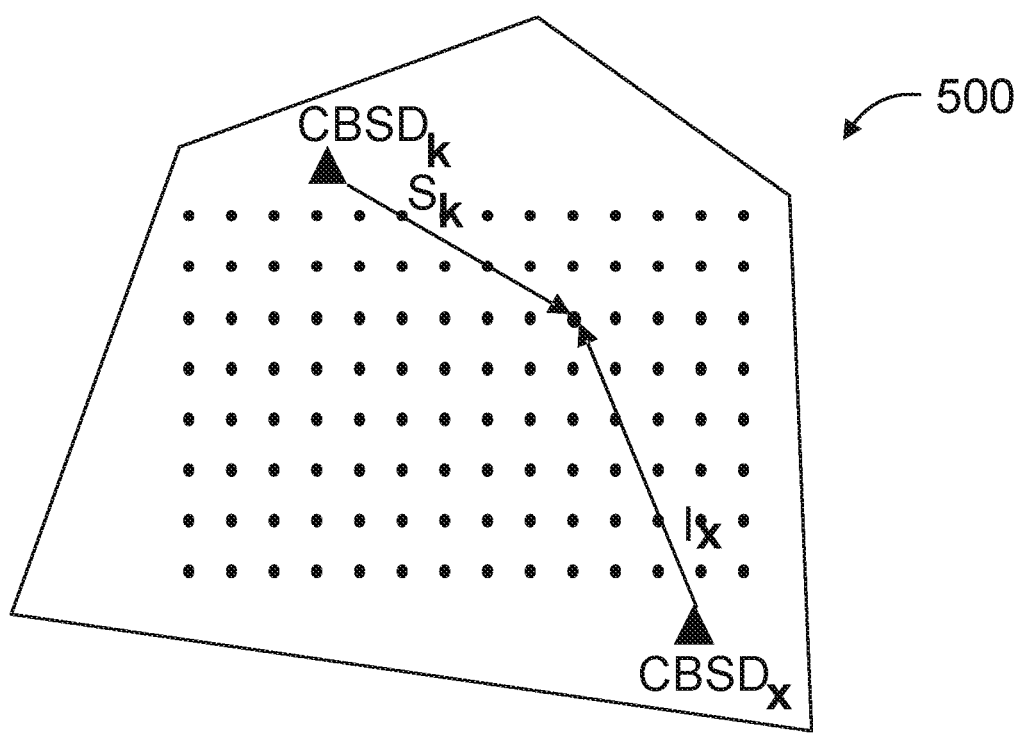
FIG. 9 is a schematic illustration of an end user device evaluation grid according to one embodiment of the present disclosure.

Methods to Assess Relative Interference Between Network Nodes in Shared Spectrum FIG. 9 illustrates an EUD Evaluation Grid (EG) 500. For example, N evaluation points are defined for the EG 500. The EG 500 could be seen as a map representing a geographical area, which may be divided into different location points corresponding to the evaluation points (or pixels). The coverage area of a CBSD could be part of the evaluation grid, for example.

In one embodiment, the user value (UV) is computed for each "pixel" in the evaluation grid. Assuming that a EUD served by $CBSD_k$ is located in the EG pixel n, then the user value for that location denoted as UV(k,n) reflects the "service" value that the user will receive from $CBSD_k$. In general, the UV may be dependent on the signal level received from the serving CBSD and the UV may be negatively impacted by interference from the other CBSDs operating in the same channel and the noise level. In some embodiments, the value of UV(k,n) can be based on computed values of propagation loss from standard propagation models such as, for example, modified Hata (see https://en.wikipedia.org/wiki/Hata_Model) or Longley Rice (https://en.wikipedia.org/wiki/Longley%E2%80%93Rice_model), or by direct channel measurements. In LTE, such direct channel measurements can include the Reference Signal Received Power (RSRP), Reference Signal Received Quality (RSRQ), Channel State Information-Reference Signal (CSI-RS) and Reference Signal-Signal Interference to Noise Ratio (RS-SINR) measurements. Other measured metrics may also be employed in some embodiments.

When a new CBSD x is introduced in the same channel, it will generally produce interference towards the users of CBSD k. In some embodiments, the controlling node 100 (e.g., SAS) will compute the user values as:

Before the $CBSD_x$ is introduced: $UV_{pre-x}(k,n)$

After the $CBSD_x$ is introduced: $UV_{post-x}(k,n)$.

For example, in FIG. 9, the variable $S_k$ refers to the Signal from the serving $CBSD_k$, and $I_x$ refers to the Interference from $CBSD_x$.

The relative user value for the pixel n and serving $CBSD_k$ may be given by: RUVx(k,n)=UVpost-x(k,n)−UVpre-x(k,n).

The average relative user value over all pixels for EUDs served by $CBSD_k$ may be: ARUVx(k)=Σn(UVpost-x(k,n)−UVpre-x(k,n))/N.

One particular case is the average user value introduced by $CBSD_x$, which may be given by: $ARUV_x(x)=\Sigma_n(UV_{post-x}(x,n))/N$, where $UV_{post-x}(x,n)$ and may be used if it is greater than a threshold γ.

Before releasing a grant for $CBSD_x$, the controlling node 100 (e.g., SAS) may ensure that: Σk(ARUVx(k))>=Th, where Th is the overall threshold used for grant approval, as an example, Th=0.

Figure 10:
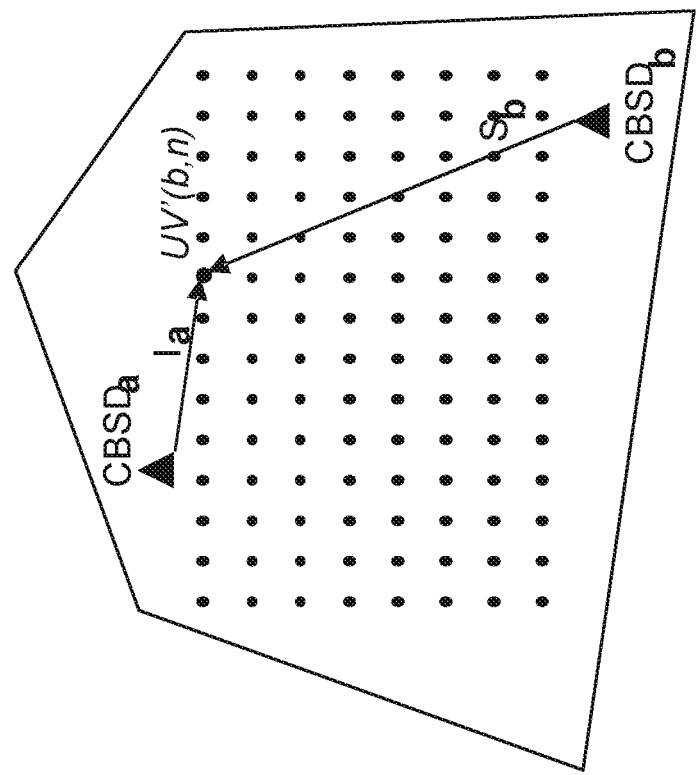
FIG. 10 is a schematic illustration of CBSDa and CBSDb belonging to the same network according to one embodiment of the present disclosure.
Figure 10:
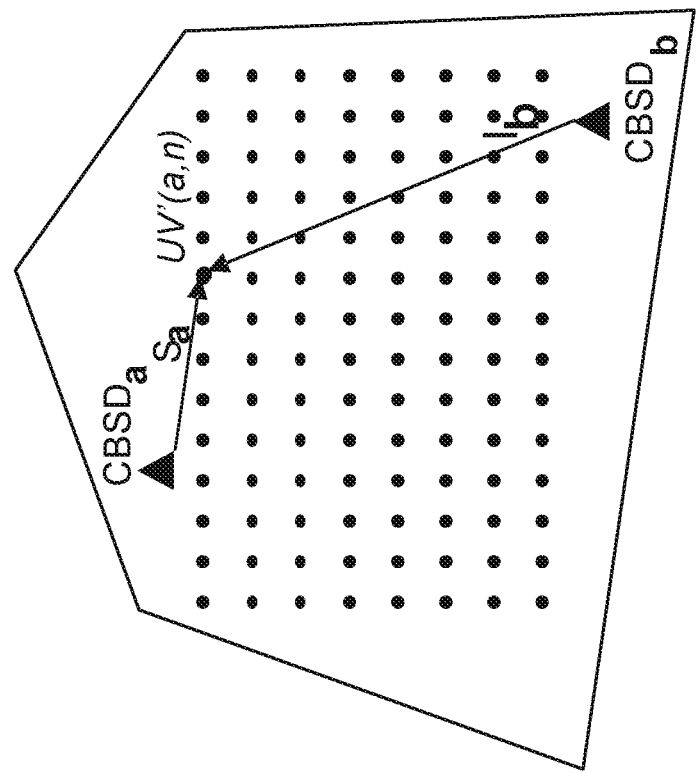

In one embodiment, a special handling may be performed for CBSDs belonging to the same network. For example, FIG. 10 shows that $CBSD_a$ and $CBSD_b$ belong to the same network. If $CBSD_a$ and $CBSD_b$ belong to the same network, the user value may be the maximum provided by either $CBSD_a$ or $CBSD_b$: $UV(a,n)=UV(b,n)=\max\{UV'(a,n), UV'(b,n)\}$, where UV' is the raw computed user value and UV is the value used by the controlling node 100 (e.g., SAS) to determine grant eligibility.

In some embodiments, network deployments may increase the User Value as compared with independent CBSD deployments.

Figure 11:
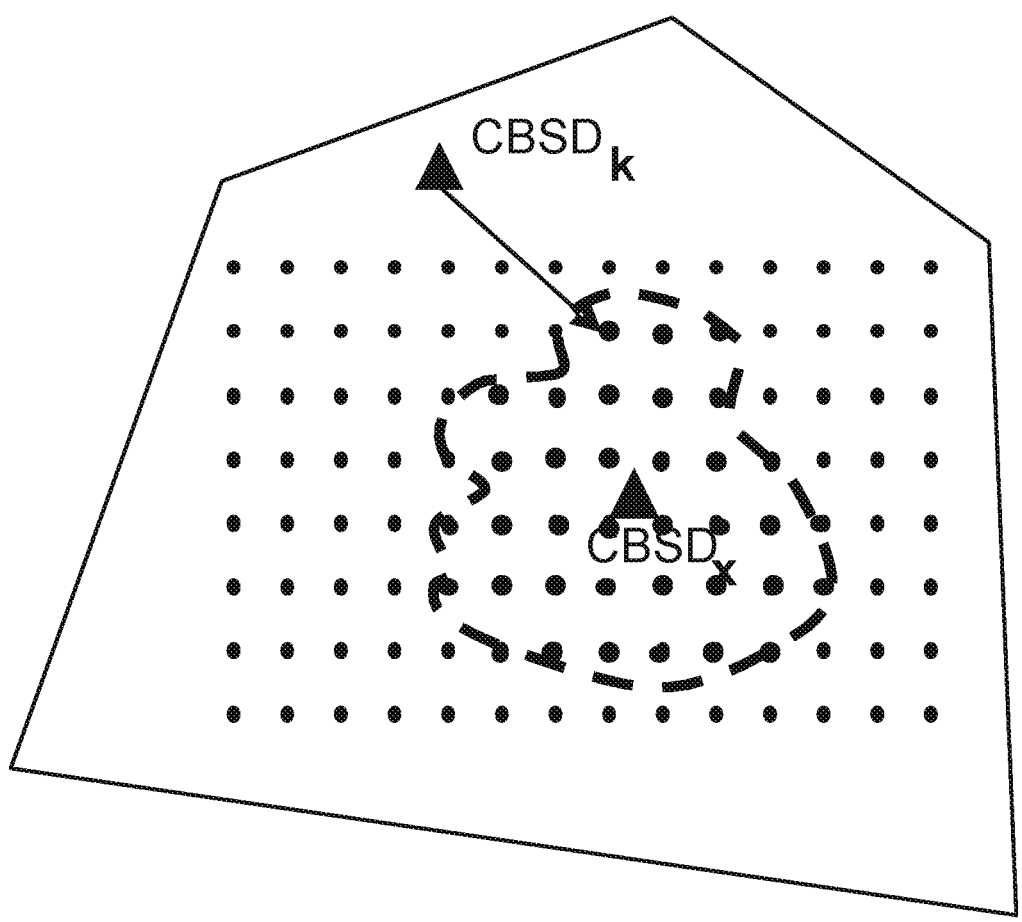
FIG. 11 is a schematic illustration of a pool of impacted CBSDs according to one embodiment of the present disclosure.

In one embodiment, the evaluation grid for approving a grant for $CBSD_x$ may be selected to cover all the pixels that are within the $CBSD_x$ coverage area. The coverage area of a CBSD may be considered the area around the CBSD where the signal level is greater than or equal than a certain signal threshold, $S_{Th}$. For example, one possible value for $S_{Th}$ is −96 dBm/10 MHz, which will match the contour definition for a PAL Protection Area (PPA). The PPA may represent a region in which interference has to be below a given threshold. Next, the controlling node 100 (e.g., SAS) may determine all the $CBSD_k$s that can impact the pixels selected for evaluation by more than the $S_{Th}$ threshold. These CBSDs may be considered part of the pool of impacted CBSDs, as shown, for example, in FIG. 11.

FIG. 12 is a flowchart that illustrates some embodiments of methods in a controlling node 100, such as, for example, SAS1, for granting resources to network nodes, in accordance with a second aspect of the present disclosure.

Some embodiments of the method 500 according to this aspect include the following steps:
Step 510: receiving a request from a network node for a grant of resources in a shared spectrum;
Step 520: in response to the request, determining an interference value based on the grant of resources to the network node; and
Step 530: in response to determining that the interference value satisfies a threshold, granting the recourses to the network node.

The network node may be, for example, a CBSD. In one embodiment, the interference value is determined through the user value function and/or the evaluation grid, as described herein above. For example, the controlling node 100 (e.g., SAS) may calculate an average relative user value, in the coverage area of the CBSD before it is granted services and after the CBSD is granted services. If the average relative user value is equal or superior to a threshold (Th), i.e. the interference value at least satisfies this threshold, then the CBSD is granted services or resources, i.e., it is allowed to transmit data. In other words, the CBSD grant request is approved if the positive effects of introducing the CBSD surpass the negative impact.

It should be noted that the user value for a location (e.g., pixel) reflects the "service" value that the user will receive from a CBSD.

As the controlling node 100 (e.g., SAS) accepts or rejects grant requests from CBSDs based on the interference value, the controlling node 100 creates or designs clusters or groups of cells and/or eNBs (or network nodes) in the system. The clusters of network nodes are created based on the determined interference value, using the relative user value, for example.

Once those clusters are created, embodiments of the present disclosure also allow the controlling node 100 to mitigate interference between nodes, for example, inter-clusters and/or intra-clusters.

Methods to Mitigate Interference Between Network Nodes in Shared Spectrum

In general, the controlling node 100 (e.g., SAS) manages interference to incumbents by Tiers 2 and 3, interference among Tier 2 devices, and interference from Tier 3 into Tier 2 (see FIG. 1). Embodiments of the present disclosure also provide for mitigating interference between clusters and within clusters.

Figure 13:
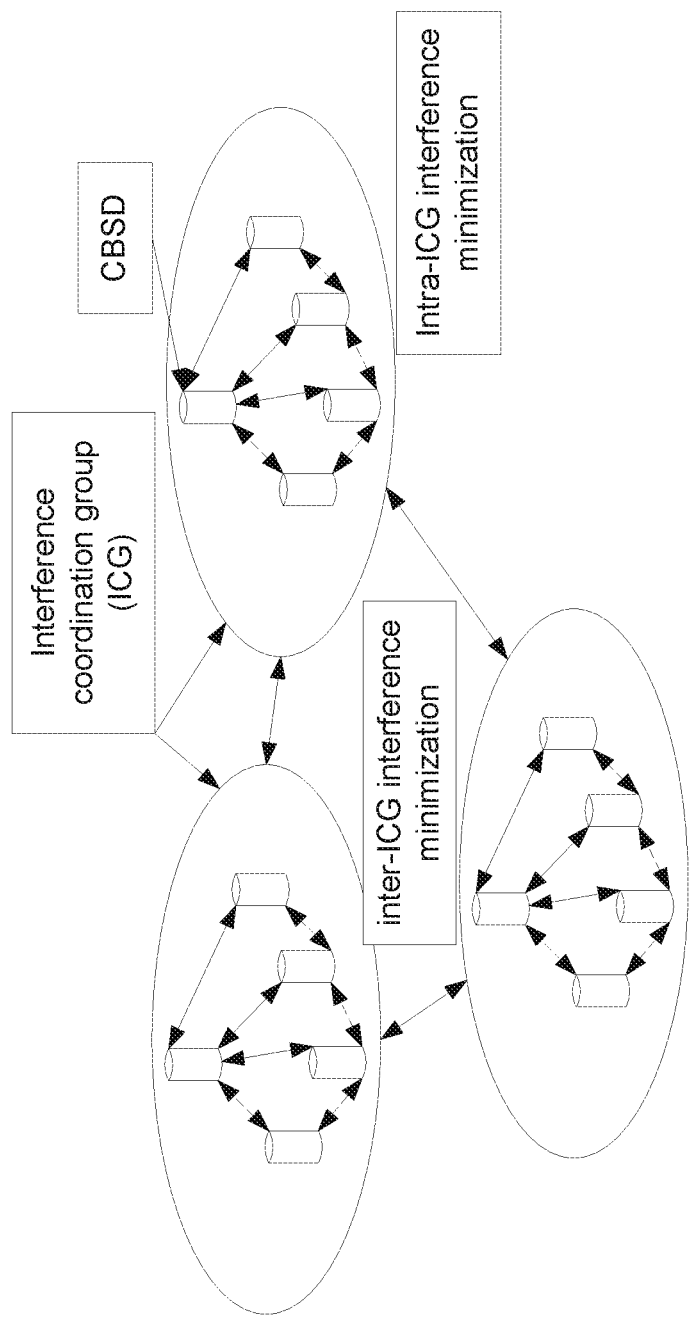
FIG. 13 is a schematic illustration of inter-cluster (or inter-Interference Coordination Group (ICG)) versus intra-cluster (or intra-ICG) interference, according to an embodiment of the present disclosure.

In order to mitigate the level of interference seen by network nodes or groups of network nodes of the same or differing radio access technologies (RATs) in a shared spectrum deployment, the network nodes can be divided into interference coordination groups (ICGs) and one or more of the following interference mitigation or reduction methods can be applied intra-group (i.e., within the interference coordination group), or inter-group (i.e., between the interference coordination groups). The conceptual notions of intra-ICG and inter-ICG are illustrated in FIG. 13.

Some of the different methods for mitigating the interference level according to embodiments of the present disclosure are given below:
Interference Alignment (IA): IA is a method in which one or more network nodes in a first group or cluster of network nodes cooperate to transmit their signals such that the interference falls onto one or more dimensions that can be orthogonalized by a network node that would potentially be interfered with by the network nodes in the first group or cluster, see [V. Cadambe and S. Jafar, "Interference Alignment and Degrees of Freedom of the K-User Interference Channel", IEEE Transactions on Information Theory, Vol 54, No. 8, August 2008, pp 3425-3441], and [K. Gomadam, V. Cadambe and S. Jafar, "A Distributed Numerical Approach to Interference Alignment and Applications to Wireless Interference Networks", IEEE Transactions on Information Theory, Vol 57, No. 6, June 2011, pp 3309-3322].

Active Antenna Systems (AAS): AAS implementations at each CBSD can be optimized according to a number of criteria to minimize interference within (intra) an interference coordination group (ICG), or between (inter) interference coordination groups. The optimization approaches can include known approaches such as interference rejection combining (IRC) or max SINR algorithms, see [D Schmidt et al. "Comparison of Distributed Beamforming Algorithms for MIMO Interference Networks", "IEEE Transactions on Signal Processing, Vol 61, No 13, July 2013].

IA plus AAS: AAS and IA can be applied both intra-ICG or inter-ICG or in combinations as listed below:
AAS optimized to minimize interference both intra-ICG and inter-ICG: In this method, a first set of AAS precoding beam weights $W_{k,i}^1$ are optimized to minimize the intra-ICG interference (i.e., the interference between CBSDs within an ICG) for the $k^{th}$ CBSD in ICG "i". Note that the optimization of this first set of precoding weights between CBSDs within different ICGs can be carried out independently. A second set of precoding weights $W_i^2$ is then applied to transmissions from CBSDs that are optimized to minimize the interference between ICGs. The resulting precoding weight for the $k^{th}$ CBSD in the $i^{th}$ ICG is thus $W_i^2 \times W_{k,i}^1$. Note that for CBSDs with N antennas the span of vectors $W_i^2$ and $W_{k,i}^1$ is "N".

IA optimized to minimize interference both intra-ICG and inter-ICG: In this method, IA is applied independently to CBSDs within each ICG to minimize interference within the ICG. Subsequently a second tier of IA is applied between ICGs to minimize interference between ICGs. For the implementation of the second tier IA, each ICG is treated as a single virtual network node or device from an IA perspective.

IA optimized intra-ICG and AAS optimized inter-ICG: In this method, IA is applied independently to CBSDs within each ICG to minimize interference within the ICG. Subsequently, precoding weights $W^2_i$ are then applied to CDSDs in ICG "I" that are optimized to minimize the interference between ICGs.

AAS optimized intra-ICG and IA optimized inter-ICG: In this method, a first set of AAS precoding beam weights $W_{k,i}^1$ are optimized to minimize the intra-ICG interference (i.e., the interference between CBSDs within and ICG) for the $k^{th}$ CBSD in ICG "i". Note that the optimization of this first set of precoding weights between different ICGs can be carried out independently. Subsequently, a second tier of IA is applied between ICGs to minimize interference between ICGs. For the implementation of the second tier IA, each ICG is treated as a single virtual network node or device from an IA perspective.

SAS-Assisted Methods to Mitigate Interference Between Network Nodes in Shared Spectrum The above-described mitigation methods assume that the intra and inter-ICG coordination is managed within a given RAT technology in a centralized manner by a master network node, or in a distributed manner by one or more CBSDs. An additional method of mitigating interference includes having a controlling node 100, such as the SAS, initiate a session based interface between the devices within an ICG or between groups of devices (i.e., ICGs) desiring coordination to create Inter-cell Interference Coordination (ICIC) or ICG group coordination between ICG groups from the same or differing RAT networks. The information exchanged over the interface can be indications of the interference between devices within an ICG as well as between ICGs, or loading on specific resource blocks as well as traffic information on a time-averaged basis. The indications of interferences are determined according to the methods as described above, such as IA, AAS, and IA plus AAS.

The intent in some embodiments is for the interface to be relatively low bandwidth and augmented by event logging of outages that can be aggregated and exchanged. A variation of this approach involves multiple controlling nodes 100 (e.g., SASs) receiving information from multiple ICGs as above and the SASs exchanging information between themselves to facilitate optimization of the ICIC.

In other words, when the controlling node 100 mitigates interference between clusters of network nodes and within a cluster of network nodes, the controlling node 100 can calculate interference mitigation parameters using Interference Alignment (IA), Active Antenna System (AAS) and/or IA plus AAS. The interference mitigation parameters may comprise generating precoding weights and beam-steering of antennas, for example.

When the controlling node 100 initiates a session based interface between the network nodes within a cluster or between clusters of network nodes, the controlling node 100 receives indications of interference between the network nodes within a cluster or between clusters of network nodes. The indications of interference include, for example, interference mitigation parameters determined by Interference Alignment (IA) computed by one or more network nodes of a cluster, interference mitigation parameters determined by an Active Antenna System (AAS) at each of the network node of a cluster and/or interference mitigation parameters determined by an IA plus AAS.

In accordance with another embodiment, within a given neighborhood of a protected incumbent or PPA, CBSDs may receive a power limit for a grant reflecting an assignment of a minimum of 1/N of the aggregate interference margin available (after any margin utilization by the network CBSDs not considered for apportionment) for that protected incumbent or PPA. The determination of "N" here can be considered the total number of CBSD grants meeting the qualifications listed, for example, in Table 1 below, to be considered for this apportionment.

TABLE 1

| Incumbent/PAL | Distance from incumbent/PAL for consideration | Maximum int'f threshold for consideration | Type of CBSD/Grant for consideration |
| --- | --- | --- | --- |
| Grandfathered Wireless Protection Zone* | 40 km | −100 dBm/10 MHz | GAA only |
| PAL Protection Area* | 40 km | −100 dBm/10 MHz | GAA and PAL separately |
| ESC Sensor | 25 km | −100 dBm/10 MHz | GAA and PAL separately |
| Inland out-of-band federal incumbent zone* | 25 km | −150 dBm/10 MHz (OOBE) | Category B only, GAA and PAL separately |
| Inland co-channel federal incumbent site | 80 km | −150 dBm/10 MHz | GAA and PAL separately |
| Coastal co-channel federal incumbent zone | FFS | −150 dBm/10 MHz | GAA and PAL separately |
| Out-of-band FSS site (pass-band) | 40 km | −150 dBm/10 MHz (OOBE) | GAA and PAL separately |
| In-band FSS site (pass-band) | 150 km | −150 dBm/10 MHz | GAA and PAL separately |
| All FSS sites (blocking) | 40 km | −150 dBm/10 MHz | Both GAA and PAL |

For rows in Table 1 marked "GAA and PAL separately," if there are qualifying CBSD grants of both PAL and GAA types, then margin apportionment shall be performed by the SAS such that CBSDs with a GAA grant shall receive a power limit for that grant reflecting an assignment of a minimum of 1/(2*N) of the aggregate interference margin available for that incumbent, where N is the number of qualifying GAA grants; and CBSDs with a PAL grant shall receive a power limit for that grant reflecting an assignment of a minimum of 1/(2*N) of the aggregate interference margin available for that incumbent, where N is the number of CBSDs with co-channel PAL grants in the neighborhood. In both cases, if there are no qualifying CBSDs of the other type, the SAS shall use 1/N apportionment where N is simply the total number of qualifying CBSD grants.

According to one aspect of the present disclosure, a method in a controlling node 100 for distribution of an interference quota (IQ) among a plurality of network nodes is provided. The method includes identifying a number of network node clusters, a network node cluster defined as a group out of the plurality of network nodes being located within a predetermined distance of each other (block S410); dividing the IQ by the number of network node clusters to provide a cluster quota (block S420); and distributing the cluster quota among each network node within each identified network node cluster (block S430).

According to this aspect, in some embodiments, the IQ is distributed among at least one of Priority Access License (PAL) channels and General Authorized Accessed (GAA) channels. In some embodiments, the method includes using a first IQ for the PAL channels and a second IQ for the GAA channels. In some embodiments, the method includes if at least a first condition is met: using a common IQ for the GAA channels and the PAL channels; and if at least a second condition is met: using a first IQ for the PAL channels and a second IQ for the GAA channels, the first IQ being different than the second IQ. In some embodiments, the method includes, as result of determining that at least one GAA channel has been introduced in at least one PAL channel, if the number of GAA channels is greater than the number of PAL channels, using a first IQ for the PAL channels and a second IQ for the GAA channels. In some embodiments, the method includes, if a number of GAA channels is equal to or less than a number of PAL channels: using a common IQ for the GAA channels and the PAL channels; and if the number of GAA channels is greater than the number of PAL channels: using a first IQ for the PAL channels and a second IQ for the GAA channels, the first IQ being different than the second IQ. In some embodiments, the controlling node 100 is a Coexistence Manager. In some embodiments, the controlling node 100 is a Spectrum Access System (SAS) and the network node is a Citizen's Broadband radio Service Device (CBSD). In some embodiments, the method includes, for each of the network node clusters, dividing the cluster quota by a number of network nodes within the network node cluster to provide a network node quota. In some embodiments, distributing the cluster quota among each network node within each identified network node cluster includes equally distributing the cluster quota to the network nodes within the corresponding network node cluster.

According to another aspect of the present disclosure, a controlling node 100 configured to distribute an interference quota (IQ) among a plurality of network nodes is provided. The controlling node 100 includes processing circuit 110 configured to: identify a number of network node clusters, a network node cluster defined as a group out of the plurality of network nodes being located within a predetermined distance of each other; divide the IQ by the number of network node clusters to provide a cluster quota; and distribute the cluster quota among each network node within each identified network node cluster.

According to this aspect, in some embodiments, the processing circuitry 110 is configured to distribute the IQ among at least one of Priority Access License, PAL, channels and General Authorized Accessed, GAA, channels. In some embodiments, the processing circuitry 110 is configured to use a first IQ for the PAL channels and a second IQ for the GAA channels. In some embodiments, the processing circuitry 110 is configured to, if at least a first condition is met: using a common IQ for the GAA channels and the PAL channels; and if at least a second condition is met: using a first IQ for the PAL channels and a second IQ for the GAA channels, the first IQ being different than the second IQ. In some embodiments, the processing circuitry 110 is configured to, as result of determining that at least one GAA channel has been introduced in at least one PAL channel, if the number of GAA channels is greater than the number of PAL channels, using a first IQ for the PAL channels and a second IQ for the GAA channels. In some embodiments, the processing circuitry 110 is configured to: if a number of GAA channels is equal to or less than a number of PAL channels: use a common IQ for the GAA channels and the PAL channels; and if the number of GAA channels is greater than the number of PAL channels: use a first IQ for the PAL channels and a second IQ for the GAA channels, the first IQ being different than the second IQ. In some embodiments, the controlling node 100 is a Coexistence Manager. In some embodiments, the controlling node 100 is a Spectrum Access System, SAS, and the network node is a Citizen's Broadband radio Service Device, CBSD. In some embodiments, the processing circuitry 110 is configured to: for each of the network node clusters, divide the cluster quota by a number of network nodes within the network node cluster to provide a network node quota. In some embodiments, distributing the cluster quota among each network node within each identified network node cluster includes equally distributing the cluster quota to the network nodes within the corresponding network node cluster.

According to yet another aspect of the present disclosure, a controlling node 100 configured to distribute an interference quota, IQ, among a plurality of network nodes is provided. The controlling node 100 includes a cluster identification module 210 configured to identify a number of network node clusters, a network node cluster defined as a group out of the plurality of network nodes being located within a predetermined distance of each other; a cluster quota distribution module 220 configured to divide the initial IQ by the number of network node clusters to provide a cluster quota; and a network interface module 230 configured to distribute the cluster quota among each network node within each identified network node cluster.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any two or more embodiments described in this document may be combined in any way with each other.

Modifications, additions, or omissions may be made to the systems and apparatuses described herein without departing from the scope of the disclosure. The components of the systems and apparatuses may be integrated or separated.

Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Some of the abbreviations used in this disclosure include:

1×RTT CDMA2000 1× Radio Transmission Technology
AAS Active Antenna System
ABS Almost Blank Subframe
ARQ Automatic Repeat Request
ARUV Average Relative User Value
ASA Authorized Shared Access
AWGN Additive White Gaussian Noise
BCCH Broadcast Control Channel
BCH Broadcast Channel
CA Carrier Aggregation
CBRS Citizen's Broadband Radio Service
CBSD Citizens Broadband radio Service Device
CC Carrier Component
CCCH SDU Common Control Channel SDU
CDMA Code Division Multiplexing Access
CGI Cell Global Identifier
CP Cyclic Prefix
CPICH Common Pilot Channel
CPICH Ec/No CPICH Received energy per chip divided by the power density in the band
CQI Channel Quality information
CRC Cyclic Redundancy Check
C-RNTI Cell RNTI
CSI Channel State Information
DCCH Dedicated Control Channel
DL Downlink
DRX Discontinuous Reception
DTX Discontinuous Transmission
DTCH Dedicated Traffic Channel
DUT Device Under Test
E-CID Enhanced Cell-ID (positioning method)
ECGI Evolved CGI
eNB E-UTRAN NodeB
ePDCCH enhanced Physical Downlink Control Channel
ESC Environmental Sensing Capability
EUD End User Device
E-SMLC evolved Serving Mobile Location Center
E-UTRA Evolved UTRA
E-UTRAN Evolved UTRAN
FDD Frequency Division Duplex
GAA General Authorized Access
GERAN GSM EDGE Radio Access Network
GSM Global System for Mobile communication
gNB Base station in NR
HARQ Hybrid Automatic Repeat Request
HO Handover
HSPA High Speed Packet Access
HRPD High Rate Packet Data
IA Interference alignment
ICIC Inter-cell interference coordination
ICG Interference coordination group
LPP LTE Positioning Protocol
LSA Licensed Shared Access
LTE Long Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control CHannel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PAL Priority Access License
PBCH Physical Broadcast Channel
P-CCPCH Primary Common Control Physical Channel
PCell Primary Cell
PCFICH Physical Control Format Indicator Channel
PDCCH Physical Downlink Control Channel
PDCH Physical Data CHannel
PDSCH Physical Downlink Shared Channel
PGW Packet Gateway
PHICH Physical Hybrid-ARQ Indicator CHannel
PLMN Public Land Mobile Network
PMI Precoder Matrix Indicator
PPA PAL Protection Area
PRACH Physical Random Access CHannel
PRS Positioning Reference Signal
PSS Primary Synchronization Signal
PUCCH Physical Uplink Control CHannel
PUSCH Physical Uplink Shared Channel
RB Resource Block
RLM Radio Link Management
RRC Radio Resource Control
RSCP Received Signal Code Power
RSRP Reference Signal Received Power
RSRQ Reference Signal Received Quality
RSSI Received Signal Strength Indicator
RSTD Reference Signal Time Difference
QAM Quadrature Amplitude Modulation
RACH Random Access Channel
RAR Random Access Response
RAT Radio Access Technology
RNC Radio Network Controller
RNTI Radio Network Temporary Identifier
RRC Radio Resource Control
RRM Radio Resource Management
RUV Relative User Value
SARUV Sum of Relative Average User Values SAS: Spectrum Access System
SCH Synchronization Channel
SCell Secondary Cell
SDU Service Data Unit
SFN System Frame Number
SGW Serving Gateway
SI System Information
SIB System Information Block
SLNR Signal leakage-to-noise ration
SNR Signal Noise Ratio
SON Self Optimized Network
SS Synchronization Signal
SSS Secondary Synchronization Signal
TDD Time Division Duplex
TRP Transmission and Reception Point
TTI Transmission Time Interval
UE User Equipment
UL Uplink
UMTS Universal Mobile Telecommunication System
UTRA Universal Terrestrial Radio Access
UTRAN Universal Terrestrial Radio Access Network
UV User Value Function
WCDMA Wide CDMA
WLAN Wireless Local Area Network
ZC Zadoff-Chu As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a controlling node for distribution of an interference quota, IQ, among a plurality of network nodes, the method comprising:
  identifying a number of network node clusters, a network node cluster defined as a group out of the plurality of network nodes being located within a predetermined distance of each other;
  dividing the IQ by the number of network node clusters to provide a cluster quota, the IQ being distributed among at least one of Priority Access License, PAL, channels and General Authorized Accessed, GAA, channels;
  distributing the cluster quota among each network node within each identified network node cluster;
  if a number of GAA channels is equal to or less than a number of PAL channels:

using a common IQ for the GAA channels and the PAL channels; and
if the number of GAA channels is greater than the number of PAL channels:
using a first IQ for the PAL channels and a second IQ for the GAA channels, the first IQ being different than the second I/Q.

2. The method according to claim 1, further comprising: using a first IQ for the PAL channels and a second IQ for the GAA channels.

3. The method according to claim 1, further comprising:
if at least a first condition is met:
using a common, 13-15 IQ for the GAA channels and the PAL channels; and
if at least a second condition is met:
using a first IQ for the PAL channels and a second IQ for the GAA channels, the first IQ being different than the second IQ.

4. The method according to claim 1, further comprising: as result of determining that at least one GAA channel has been introduced in at least one PAL channel, if a first number of GAA channels is greater than a second number of PAL channels, using a first IQ for the PAL channels and a second IQ for the GAA channels.

5. The method according to claim 1, wherein the controlling node is a Coexistence Manager.

6. The method according to claim 1, wherein the controlling node is a Spectrum Access System, SAS, and the network node is a Citizen's Broadband radio Service Device, CBSD.

7. The method according to claim 1, further comprising:
for each of the network node clusters, dividing the cluster quota by a number of network nodes within the network node cluster to provide a network node quota.

8. The method according to claim 1, wherein distributing the cluster quota among each network node within each identified network node cluster comprises equally distributing the cluster quota to the network nodes within the corresponding network node cluster.

9. A controlling node configured to distribute an interference quota, IQ, among a plurality of network nodes, the controlling node comprising processing circuit configured to:
identify a number of network node clusters, a network node cluster defined as a group out of the plurality of network nodes being located within a predetermined distance of each other;
distribute the IQ among at least one of Priority Access License, PAL, channels and General Authorized Accessed, GAA, channels;
divide the IQ by the number of network node clusters to provide a cluster quota;
distribute the cluster quota among each network node within each identified network node cluster;
if a number of GAA channels is equal to or less than a number of PAL channels:
use a common IQ for the GAA channels and the PAL channels; and
if the number of GAA channels is greater than the number of PAL channels:
use a first IQ for the PAL channels and a second IQ for the GAA channels, the first IQ being different than the second IQ.

10. The controlling node according to claim 9, wherein the processing circuitry is configured to use a first IQ for the PAL channels and a second IQ for the GAA channels.

11. The controlling node according to claim 9, wherein the processing circuitry is configured to:
if at least a first condition is met:
use a common IQ for the GAA channels and the PAL channels; and
if at least a second condition is met:
use a first IQ for the PAL channels and a second IQ for the GAA channels, the first IQ being different than the second IQ.

12. The controlling node according to claim 9, wherein the processing circuitry is configured to, as result of determining that at least one GAA channel has been introduced in at least one PAL channel, if a first number of GAA channels is greater than a second number of PAL channels, using a first IQ for the PAL channels and a second IQ for the GAA channels.

13. The controlling node (100) according to claim 9, wherein the controlling node is a Coexistence Manager.

14. The controlling node according to claim 9, wherein the controlling node is a Spectrum Access System, SAS, and the network node is a Citizen's Broadband radio Service Device, CBSD.

15. The controlling node according to claim 9, wherein the processing circuitry is configured to:
for each of the network node clusters, divide the cluster quota by a number of network nodes within the network node cluster to provide a network node quota.

16. The controlling node according to claim 9, wherein distributing the cluster quota among each network node within each identified network node cluster comprises equally distributing the cluster quota to the network nodes within the corresponding network node cluster.

* * * * *

UNITED STATES PATENT AND TRADEMARK OFFICE
CERTIFICATE OF CORRECTION

PATENT NO. : 10,631,303 B2
APPLICATION NO. : 15/761636
DATED : April 21, 2020
INVENTOR(S) : Cimpu et al.

Page 1 of 2

It is certified that error appears in the above-identified patent and that said Letters Patent is hereby corrected as shown below:

In the Specification

In Column 6, Line 12, delete "CBSDa and CBSDb" and insert -- $CBSD_a$ and $CBSD_b$ --, therefor.

In Column 10, Line 13, delete "and/or or" and insert -- and/or --, therefor.

In Column 12, Line 17, delete "level" and insert -- level. --, therefor.

In Column 12, Lines 48-50, delete "$\frac{80\ dBm}{2*NGAA}$" and insert -- $\frac{80\ dBm}{2*N_{GAA}}$ --, therefor.

In Column 13, Lines 20-22, delete "$\frac{80\ dBm}{2*NGAA}$" and insert -- $\frac{80\ dBm}{2*N_{GAA}}$ --, therefor.

In Column 13, Lines 59-60, delete "$\frac{80\ dBm}{2*NPAL}$ and $\frac{80\ dBm}{2*NGAA}$" and insert -- $\frac{80\ dBm}{2*N_{PAL}}$ and $\frac{80\ dBm}{2*N_{GAA}}$ --, therefor.

In Column 14, Lines 28-30, delete "$\frac{-80\ dBm}{2*NPAL}$ and $\frac{-80\ dBm}{2*NGAA}$" and insert -- $\frac{-80\ dBm}{2*N_{PAL}}$ and $\frac{-80\ dBm}{2*N_{GAA}}$ --, therefor.

In Column 14, Line 59, delete "or me" and insert -- of the --, therefor.

Signed and Sealed this
Fourth Day of August, 2020

Andrei Iancu
*Director of the United States Patent and Trademark Office*

CERTIFICATE OF CORRECTION (continued)

In Column 14, Lines 62-63, delete "$\overline{Nclusters}^{-80 \text{ dBm}}$" and insert -- $\dfrac{-80 \text{ dBm}}{Nclusters}$ --, therefor.

In Column 15, Lines 16-19, delete "$IQ_{PAL} = \dfrac{-80 \text{ dBm}}{2 * N_c - PAL}$" and insert -- $IQ_{PAL} = \dfrac{-80 \text{ dBm}}{2 * N_c - PAL}$ --, therefor.

In Column 16, Line 44, delete "$UV_{pre-x}(k,n)$" and insert -- $UV_{pre-x}(k,n)$. --, therefor.

In Column 16, Lines 50-51, delete "RUVx(k,n)=UVpost-x(k,n)-UVpre-x(k,n)." and insert -- $RUV_x(k,n) = UV_{post-x}(k,n) - UV_{pre-x}(k,n)$. --, therefor.

In Column 16, Lines 53-54, delete "ARUVx(k)=Σn(UVpost-x(k,n)-UVpre-x(k,n))/N." and insert -- $ARUV_{x(k)} = \Sigma_n(UV_{post-x}(k,n) - UV_{pre-x}(k,n))/N$. --, therefor.

In Column 16, Lines 56-57, delete "$ARUV_x(x) = \Sigma_n(UV_{post-x}(x,n))/N$, where $UV_{post-x}(x,n)$" and insert -- $ARUV_x(x) = \Sigma_n(UV_{post-x(x,n)})/N$, where $UV_{post-x(x,n)}$ --, therefor.

In Column 16, Line 60, delete "$\Sigma k(ARUVx(k)) >= Th$," and insert -- $\Sigma k(ARUV_{x(k)}) >= Th$, --, therefor.

In Column 17, Line 9, delete "CBSD$_x$may" and insert -- CBSD$_x$ may --, therefor.

In Column 18, Line 44, delete ""IEEE" and insert -- IEEE --, therefor.

In Column 19, Line 8, delete "CDSDs in ICG "I"" and insert -- CBSDs in ICG "i" --, therefor.

In Column 22, Lines 41-42, delete "cluster identification module 210" and insert -- cluster identification module 310 --, therefor.

In Column 22, Lines 45-46, delete "cluster quota distribution module 220" and insert -- cluster quota distribution module 320 --, therefor.

In Column 22, Line 48, delete "network interface module 230" and insert -- network interface module 330 --, therefor.

In the Claims

In Column 27, Line 7, in Claim 1, delete "I/Q." and insert -- IQ. --, therefor.

In Column 28, Line 33, in Claim 13, delete "node (100)" and insert -- node --, therefor.